United States Patent
Lane et al.

(10) Patent No.: US 7,333,001 B2
(45) Date of Patent: Feb. 19, 2008

(54) SECURE PERSONAL RFID DOCUMENTS AND METHOD OF USE

(76) Inventors: Kathleen Lane, 10695 Magdalena Ave., Los Altos Hills, CA (US) 94024; William Lane, 10695 Magdalena Ave., Los Altos Hills, CA (US) 94024; Roger Stewart, 16575 Oakview Cir., Morgan Hill, CA (US) 95037

( * ) Notice: Subject to any disclaimer, the term of this patent is extended or adjusted under 35 U.S.C. 154(b) by 254 days.

(21) Appl. No.: 10/731,036

(22) Filed: Dec. 9, 2003

(65) Prior Publication Data
US 2004/0233040 A1    Nov. 25, 2004

(51) Int. Cl.
*H04Q 5/22*    (2006.01)
*G05B 19/00*    (2006.01)
*G06F 7/00*    (2006.01)
*G08B 29/00*    (2006.01)
*H04B 1/00*    (2006.01)

(52) U.S. Cl. .................. 340/10.1; 340/5.86; 340/10.51
(58) Field of Classification Search ............... 340/10.1, 340/5.86, 10.51, 10.52, 572, 572.1; 713/168, 713/172, 159; 235/487, 492–494, 375; 709/245, 709/204–206
See application file for complete search history.

(56) References Cited
U.S. PATENT DOCUMENTS

| | | | | |
|---|---|---|---|---|
| 5,396,218 A | * | 3/1995 | Olah | ........................ 340/568.7 |
| 5,517,188 A | * | 5/1996 | Carroll et al. | ........... 340/10.52 |
| 5,528,222 A | * | 6/1996 | Moskowitz et al. | ...... 340/572.7 |
| 5,757,918 A | * | 5/1998 | Hopkins | ....................... 705/67 |
| 6,100,804 A | * | 8/2000 | Brady et al. | ............. 340/572.7 |
| 6,111,506 A | * | 8/2000 | Yap et al. | ................. 340/572.1 |
| 6,297,727 B1 | | 10/2001 | Nelson | |
| 6,463,416 B1 | | 10/2002 | Messina | |
| 6,587,756 B2 | * | 7/2003 | Moriguchi et al. | ............. 701/1 |
| 6,785,739 B1 | * | 8/2004 | Tutt et al. | .................... 709/245 |
| 6,847,299 B2 | | 1/2005 | Franks | |
| 6,892,301 B1 | * | 5/2005 | Hansmann et al. | ......... 713/172 |
| 2001/0048756 A1 | | 12/2001 | Staub | |
| 2002/0005774 A1 | | 1/2002 | Rudolf | |

* cited by examiner

Primary Examiner—Brian Zimmerman
Assistant Examiner—Nam Nguyen
(74) Attorney, Agent, or Firm—Patrick Reilly

(57) ABSTRACT

A method and apparatus for authenticating entities to use an intelligent interactive Electronic Product Code stored in an RFID tag attached to a document as a means for third parties to ascertain a document is not counterfeit and has not been revoked or changed. In addition, such intelligent RFID tags can uniquely identify a particular document and data related to the document. The authenticating agency can utilize a public or private Electronic Product Code database as a means for the authenticating agency and third parties to authenticate documents and data in documents. The intelligent interactive Electronic Product Code can be used as an anti counterfeit mechanism enabling third parties requested to provide services, benefits or monetary payments to authenticate documents and or the data associated with the document is not counterfeit.

19 Claims, 15 Drawing Sheets

SECURE PERSONAL RFID DOCUMENTS AND METHOD OF USE

RELATED PATENT APPLICATIONS

This application claims benefit of the priority date of the U.S. Provisional Patent Application Ser. No. 60/428,529, filed on Nov. 23, 2002, and entitled "RFID tags for legal certification of document identify and associated information," inventors Kathleen Lane and William Lane. This application additionally claims benefit of the priority date of the U.S. patent application Ser. No. 10/456,454, filed on Jun. 7, 2003, and entitled "Birth and other legal documents having an RFID device and method of use for certification and authentication," inventors Kathleen Lane and William Lane.

FIELD OF THE INVENTION

The present invention relates to devices, systems and methods used to associate and authenticate data with a document by means of a radio frequency identification device ("RFID"), or other suitable electronic device known in the art.

BACKGROUND OF THE INVENTION

State, local and federal government agencies or their authorized agents are responsible for collecting, storing, and authenticating vital record events including birth, adoption, marriage, divorce and death and subsequently providing certified copies of such information to external parties who then rely on such printed information certified to be a true copy or extract of original life documents to authorize services and benefits to individuals. Authenticated, certified documents and extracts of information printed on certified copies was historically provided and certified as authentic by combining a corporate seal on a document with various types of watermark, barcodes or other supposed anti counterfeit paper printing processes designed to circumvent third parties from printing documents which could be perceived as authentic when such legal documents are presented as the basis for granting services or benefits to an individual.

As one prior art example, U.S. Pat. No. 6,463,416 discloses an authentication system for identification documents. However, the prior art does not anticipate or suggest an original storing of a unique serial number with the documents that can be used to identify which trusted authenticating agency created the document and the data on the document, or develop automated processes which utilize the serial number as a way of authenticating the document and related data. Further, the process does not vision the birth registration process to include and authenticate unique identity data such as DNA or biometrics as part of the birth registration record, which may be subsequently associated with the birth registration record through the RFID tag as hidden data either stored in the tag or on the network. Such digital identity data may be used by the individual to validate they are who they say they are in subsequent business transactions. Further, the process does not envision the use of a unique serial number on a document to facilitate the development of business processes which can use the serial number to validate the authenticity of the document and associate data related with the documents, i.e., update identify information with subsequent transactions recording of life events which impact such identity information, or find out if the authenticated information provided by the authenticating agency has been revoked. In addition, U.S. Pat. No. 6,463,416 neither anticipates nor suggests employing a serial number referring back to a database for validation and authentication of documents and data. A search of known patents covering RFID show none relevant to the development of a unique serial number stored within the RFID which can be used to eliminate the counterfeiting of life event documents such as birth certificates, death certificates, marriage licenses or divorce or the use of adding and authenticating digital data with the birth registration record which can be embedded and hidden within the IC chip for transactions that can authenticate the owner of the document when applying for services, benefits or monetary payments.

For instance, United States Patent Application Serial Number 2001/0048756 ("application 8756") discusses the use of DNA as a means of identifying newborns and using such information to verify the relationship of the mother and the child and as a means for future identification of a child. However, application 8756 does not include nor anticipate the association of the DNA with the individual birth registration process and the subsequent distribution of such authenticated identity data by a state registrar when printing a certified copy of a birth certificate.

United States Patent Application Serial Number 2002/005744, entitled RFID Tag for Authentication and Identification, neither discloses nor anticipates the use of the RFID tag to presenting rights similar to a corporate seal whereas the present invention provides a structure of an RFID tag that can identify authenticating agency that (1) created the corporate seal and/or (2) attests the data on the document is authentic. Furthermore, United States Patent Application Serial Number 2002/005744 does not envision the use of an Electronic Product Code, to access related data on a network based upon a unique serial number embedded into the document. Nor does application 5744 refer to the ability of the authenticating agency to include "hidden" personal identity data as part of the RFID tag to be used to assure the bearer of a certified document is the owner of the document, as is included within the present invention. Application. 5744 purports to authenticate the recipient of a document, but does not disclose nor anticipate any processes whereby the RFID tag may be used to authenticate the entity that created the document and a means to authenticate the document is not a counterfeit document, as is included within embodiments of the method of the present invention.

The existing federal standards defined for states to collect and store birth, death and other vital record events do not reference the recording and storing of unique identity data such as DNA or biometrics with authenticated birth records which can subsequently be provided as authenticated information about an individual by the state or local government agency preserving such birth records.

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it hard to count objects or individually check expiration dates.

Currently cartons are marked with barcode labels. These printed labels have over 40 "standard" layouts, and can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. Only with RFID does the physical layer of actual goods automatically tie into software applications, to provide accurate tracking. Also, none of the information of these barcodes is protected or "hidden" from unauthorized readers, making counterfeiting and fraud easy and raising concerns about the loss of privacy.

The emerging RFID technology employs a radio frequency ("RF") wireless link and ultra-small embedded computer chips, to overcome these barcode limitations. RFID technology allows physical objects to be identified and tracked via these wireless RFID tags, or "tags". An RFID tag may function like a bar code that communicates to a reader automatically without needing manual line-of-sight scanning or singulation of the objects. Applied RFID technology promises to radically transform the retail, pharmaceutical, military, and transportation industries, as well as many product or document distribution methods.

An RFID system begins with a reader sending out electromagnetic signals to find a tag. When the radio wave hits the tag and the tag recognizes the reader's signal, the reader decodes the data programmed into the tag. The information is then passed to a server for processing. By tagging a variety of items, information about the nature and location of goods can be known instantly and automatically.

An RFID system may consist of two primary components, an RFID tag ("tag") and a "tag reader". The tag typically includes an IC chip and an antenna. The IC chip may include a digital decoder needed to execute the computer commands that the tag receives from the tag reader. The IC chip also includes a power supply circuit to extract and regulate power from the RF reader; a detector to decode signals from the reader; a transmitter to send data back to the reader; anti-collision protocol circuits; and at least enough EEPROM or "durable" memory to store its EPC code.

Certain prior art RFID systems use reflected or "back-scattered" radio frequency (RF) waves to transmit information from the tag to the reader. Since passive (Class-1 and Class-2) tags get all of their power from the reader signal, the tags are only powered when in the beam of the reader.

Semi-passive and active tags have a battery to provide power to the chip. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

In 2003, the worldwide total RFID market size was $1.5B in 2002 and has been growing rapidly. The total RFID market will grow to $7.25B by the year 2008. More detailed information about EPC codes and RFID technology is readily available in various public reports published by MIT, in various commercial publications like the RFID Journal, and on many websites including the "EPCglobal" website.

No prior art processes are known for use or anticipate intelligent RFID tags for use in storing an Electronic Product Code, or EPC, for the purpose of uniquely identifying an original, copy, instantiation or instance of a legal document and the authenticating entity who issued the document. No prior art process exist wherein one or more authenticating agencies embed or attach RFID tags uniquely identifying a document and the data in the document whereby such unique Electronic Product Code enables third parties to validate the document is authentic and the data referenced on the document is authentic. The present invention optionally provides an Electronic Product Code schema to uniquely identify the entity creating the document, the unique instance of each document, the data related to each unique instance of a document, and a process uniting other parties involved in a document workflow when such third party automated processes utilize the Electronic Product Code stored in the tag to read, write and store data stored in the tag or available on a network. The net effect of the invention is to prevent counterfeit documents being used to request and receive benefits, services or monetary payments from third parties who can now validate if the documents and the related data are accurate and authentic.

The existing standards and prior art for recording other life events records such as marriage or divorce do not include processes for using the intelligent Electronic Document Code included as part of the printing of a certified copy of a Birth Certificate to link and associate other events related to an individual such as marriage or death which can enable the owner of the life event data records to link and associate recordings of future life event with prior life events databases.

RFID circuit tags, also referred to herein as RFID circuits and RFID tags are presently manufactured and used to track a plethora of items and materials, from items of apparel to volumes of coal as stored by grade and quality. Alien Technology, mentioned as one exemplary manufacturer, provides a 915 MHz RFID tag with 64 bits of field programmable memory and 16 bits of CRC. Yet the prior art fails to suggest or anticipate the use of RFID tags as an intelligent Electronic Document Code for federal, state or local government to certify life event and other legal documents with a unique digital intelligent code or the ability for third parties to use an intelligent Electronic Document Code to be used to assure a document is not counterfeit. No such prior art is known where agencies responsible for collecting and storing birth registration records collect an authenticate DNA or other biometric data as part of an individual birth record and enables a birth document to include such digital identity data as hidden digital data using the intelligent attributes of RFID tags.

It is an optional object of the present invention to provide new business processes to store, collect, distribute, and maintain unique identity data such as DNA or other biometric information about an individuals as part of a life event record maintained and authenticated by a certifying agency or its agents. Such unique identity data can be made available as hidden data embedded in an RFID tag on life event documents such as birth certificates and used as a means to track and link other life event transactions.

The existing MIT Auto-ID center is developing processes and procedures for authenticating and tracking products using a unique product code available to third parties for use in supply chain management processes. The existing Electronic Product Code descriptions apply to products, not documents.

It is an object of the present invention to improve the management and use of a document by providing an Electronic Product Code to help identify and distinguish a particular original instance, instantiation or copy of a document.

It is an additional object of certain preferred embodiments of the present invention to provide to means to store or associate the Electronic Product Code and other information within an RFID device, or other suitable electronic device known in the art, wherein the RFID device is coupled or associated with the document. The document may be electronic, virtual, and/or in a hard copy form according to various preferred embodiments of the method of the present invention.

SUMMARY OF THE PRESENT INVENTION

Towards this and other objects made obvious in light of the present disclosure, a method and system are provided to utilize intelligent RFID technology, or other suitable electronic information storage technology known in the art, with a unique Electronic Product Code whereby such intelligent Electronic Product Code can be added to each printing of certified or other legal documents to uniquely identify the document and prevent other parties from counterfeiting such certified or legal documents. The RFID tag enables existing passive printed documents to become smart and interactive, enabling automated processes to validate a document and data related to the document is real, not counterfeit nor revoked, when a document is presented to request and receive services, benefits or monetary payments. The invention also enables new automated business processes which can "read" hidden invisible digital data embedded in an RFID attached to a paper document. The invention stores a unique Electronic Product Code within the RFID and associates the RFID tag with a specific document and a specific transaction enabling third parties to easily identify the authenticating agency that created the document and authenticate the document and the data on the document. The invention uses the EDC code as a means for third parties to be assured a document being presented is an authentic document. The invention also uses, in certain embodiments of the present invention, a portion of the data on the tag, the EDC code, as a database pointer enabling automated business processes to rapidly access data linked to the documents stored in a network database.

Certain preferred embodiments of the method of the present invention provide a secure document containing (1) a flexible substrate having a surface, wherein the surface visibly presenting information and (2) an integrated circuit coupled with the substrate. The integrated circuit includes, a durable memory, the durable memory storing a $1^{st}$ digital code and a $2^{nd}$ digital code, wherein the $1^{st}$ digital code is related to a life factor, and $2^{nd}$ digital code is not readable from the durable memory, and whereby certification for the authentication and/or accuracy of the secure document is based at least partly on the $1^{st}$ digital code or $2^{nd}$ digital code stored within the integrated circuit.

The present invention relates to new methods useful to an authenticating agency or its representatives to eliminate counterfeiting of life event documents or other legal documents by associating a unique embedded Electronic Product Code with a printed document. The issuer of authentic documents can now attach hidden digital personal identity information to a printed document enabling third parties to use automated processes to authenticate and validate the authenticity of the document and an option to authenticate the individual who owns the document. Such processes are especially useful when individuals request third parties to make monetary payments or provide services based on data printed on a document. In some instances, the business processes may not require data to be printed on the physical document; the RFID tag can link to data stored on the network and available for processing by the third party.

The present invention also provides new methods useful to an authenticating agency or its representatives to collect, add maintain, store, associate, certify, authenticate and distribute digital identity data such as DNA, or other biometric information as hidden identity data within the RFID tag which can subsequently be read and verified in transactions to verify the individual representing ownership of the document is the rightful owner.

For instance, in one instance of the invention, the state Vital Records department may collect, store and subsequently certify the DNA or other biometric data collected and stored as part of each individual birth or death registration process and distribute such certified identity data as hidden data stored in the RFID on a certified birth or death certificate. The identity data certified by the authenticating agency can be made available in related transactions whereby a vital records document is used as proof of identity for benefits and services, i.e., insurance benefits, a drivers' license or a passport.

These secure "electronic watermarked" documents may optionally include a small integrated circuit embedded within or laminated to the paper or plastic material of the document using suitable techniques known to those skilled in the art. These techniques are described in detail in technical papers and other public documents published by the Alien Technology Corporation of Morgan Hill, Calif., Matrics Corporation in Columbia, Md., and the Massachusetts Institute of Technology in Cambridge, Mass.

Secure personal documents are often used to memorialize and certify personal life-changing events such as someone's date and country of birth, death, adoption, naturalization, citizenship, marriage, divorce, graduation from school, transition between countries, etc. Secure personal documents often represent an agency's (State, County, Church, Company, Bank, Hospital, College, National Government) certification of one or more life events.

A suitable durable electronic memory circuit known in the art, such as an EEPROM, coupled with or associated with a secure personal document may contain both public and hidden or private Personal Identification ("PI") including:

(a) information about the life event including name, parents, location, state, time, etc;
(b) biometric data about the individual linked to this document to help verify that any particular person is in fact the person referred to in the document;
(c) information linking an authentic and secure personal document to other personal documents; and
(d) information stored redundantly as representations of data in more than one human languages, e.g., French and Arabic, or English and Lithuanian.

A portion or portions of personal information or other information may optionally be locked with a hierarchy of multiple pass-codes, "PIN" codes, or "secret" codes wherein some portions may be public. Some other portions of information may be accessible only to the individual they describe. Yet other portions of information are, according to certain other alternate preferred embodiments of the method of the present invention, accessible to the police, airport inspectors, or other selected authorities. Still other portions of bio-metric information may only be available under court order from an even higher authority legal as needed to resolve an identity theft, or suspected or attempted impersonation situation.

In the preferred embodiment shown in FIG. 12, the secret codes are used to control access to portions of the personal information but are themselves never available to anyone once they are written into the RFID tag or the reader.

According to certain other alternate preferred embodiments of the method of the present invention authentic secure personal documents may be organized into an interlinked hierarchy wherein some primary documents, e.g., a birth certificate, are used to certify one's birth, while other documents, e.g., a driver's license, reference an individual's birth indirectly through the primary birth certificate document. All of these documents may remain permanently linked to each other by means of a common Electronic Document Code ("EDC") and an information technology system so that a change in one may be quickly reflected in them all. For example, a death or a recording of a death might automatically invalidate that person's driver's license or their voter's registration.

These secure documents are also an efficient instrument for delegating authority from one agency to another—for example the County Government may delegate to local hospitals or doctors the authority to generate birth certificates simply by securely transmitting certain secret information and codes into the to that hospital's computer. The near-instantaneous transfer of a few secret codes from the state or other authoritative agency to the hospital, may now replace the issuance of State Seals in some embodiments of the method of the present invention.

Another benefit of this interlinked system of secure documents is that problems can also be corrected quickly. For example in the hospital example cited above, if we found that the hospital had been issuing counterfeit of improper birth certificates, then not only could that hospital's authority to issue new birth certificates be quickly revoked, but the legitimacy of previously issued legally invalid birth certificates could also be quickly withdrawn. This would immediately invalidate not just all of the invalid birth certificates themselves but also all drivers licenses and other documents that were derived from a counterfeit or invalid birth certificate or other life document.

The present invention more particularly relates to the use of RFID tags by a trusted authenticating agent to create and embed a unique digital Electronic Product Code on documents which can be used by third parties as a means to authenticate the document and data related to the document. In particular, the present invention covers the use of RFID tags by authenticating agents to uniquely identify each instance of a document creation and enable third parties to reference such Electronic Product Code to validate such document and related document data as authentic, whether such data is printed on the document or available on a network. Such invention is particularly useful for authenticating agencies to eliminate counterfeiting of documents such as (1) birth and death registration processes which collect and certify personal identity, (2) other legal documents such as marriage, divorce records, and adoption records, and (3) other monetary payment documents subject to counterfeiting such as payroll checks or certified checks; and is especially useful for third parties who provide benefits, monetary payments and services to individuals who request services, monetary payment or benefits based upon data printed on the document. Such third parties can now authenticate the document is not a counterfeit or incorrect document before authorizing a benefit, service or monetary payment.

In addition, the present invention utilizes the Personal Information to link subsequent or prior life event data records with other prior life event records. For instance, the recording and authentication of a subsequent life event such as marriage or divorce may automatically identify and notify the authenticating agent who created the original birth record of a name change and to associate and link such name change with the original document. In an alternative embodiment, if the maiden name of an individual identified as related to an Electronic Product Code document like a birth certificate is changed when an individual is married, the recording of the marriage event and printed on a marriage license containing an RFID smart tag can link the old name on the birth certificate with the new name on the marriage license. In addition, the death of an individual recorded and authenticated by a state or local government agency may automatically link to the original birth record using the RFID tag embedded with the Birth Certificate and data stored in the RFID tag or on the network.

The invention covers the use of RFID tags to create a unique digital Electronic Product Code which can identify the authenticating agency who issued the document, a document type, and a unique serial number which are combined together to create a unique Electronic Product Code for every instance a document is printed. All parties can build automated business processes to validate and authenticate the document, or data authorized by the document is accurate and not counterfeit. In some instances, the data related to the Electronic Product Code can establish business processes whereby a document can be presented for services for only one time, or a specified number of times. Automated business processes would enable third parties requested to provide services, benefits or monetary payment to know such service has been provided, enabling such third party to not provide requested services.

RFID tags can be used to create and associate a digital Electronic Product Code which can uniquely identify and authenticate a specific document; said Electronic Product Code can be factory embedded during a paper printing process and/or created at print time by an authorized legal entity or its agents and attached to the printed paper, or a use a combination of factory and print processes. The Electronic Product Code may create a record of each instance a life event or other authentic document is created. Said RFID tag can be included with certified documents or other authentic documents and be used to validate a document and/or the data in the document is authentic when a request for services, benefits, or monetary payment authorized by the document is made. The Electronic Product Code is embedded in a memory chip contained within a smart tag on individual documents. The chip can be scanned by a radio frequency "reader," which transmits the document's embedded identity code to a network, where "real" information about the document can be kept. That information is then communicated back from the network to provide whatever information is needed about that product to the requestor. The information stored within the RFID tag or accessed on the network can identify what entity authorized or printed the document. Each RFID tag can include a unique serial number which can identify a particular instance an authenticating agency printed a document and the data related to a particular instance of a printed document. Such related data can provide the same rights and privileges to an authentic document as a raised corporate seal or bar code does. Said digital Electronic Product Code can refer to information on the network or information stored and read within the RFID to identify who created the document and what data is related to the authentic document. Third parties can develop business processes utilizing the Electronic Product Code to validate the document and data on the document is accurate and authentic before granting services, benefits, or monetary payments to individuals presenting the documents as authentic. Said Electronic Product Code can enable other business processes to manage and access data related to the document which may not be printed on the document or stored in the RFID tag but is available in electronic form referred and linkable in a remote database. Implementation of Electronic Product Codes does not depend on RFID technology; any way of being able to quickly and easily read both public and hidden digital information from a document will work.

The present invention covers an optional ability to validate that a life event document is authentic and/or validate that all of some of the data contained in a life event document or record is accurate.

The integration of radio frequency identification ("RFID") circuit tags as an intelligent digital Electronic Product Code enabling the tracking and authentication of hard copy documents and data related to the documents is a convergence of technologies that is often useful for authenticating agents in managing document identification and deterring counterfeit or other unauthorized copies of certified or other legal documents.

The Personal Information codes may identity and provide automated links to the original records used to create the document and can also be used as a unique key for associating other data and transactions related to each document. In addition, authenticating agencies can elect to collect, store, certify and distribute identity data associated with the individual identified on the authenticated document, including but not limited to DNA, biometrics, or other unique identifying data as hidden data stored in an RFID tag. Said hidden identity data can be used in automated business processes to validate the owner and accuracy of the document The RFID tag may also communicate with a GPS chip on a nearby reader to permit tracking and location of legal documents.

In certain preferred embodiments of the present invention the method of the present invention is applied within an information technology system. The information technology system ("IT system") may comprise a communications network or a distributed computer network, such as an Intranet, an extranet or the Internet. The IT system may optionally comprise RFID tags coupled with documents, physical objects, assets, physical assets, certificates, information storage modules, electronic devices, equipment, machinery, animals, livestock, plants, suitable biological entities or materials, suitable inorganic material, minerals, metallic ore, hydrocarbon fuels, and/or vehicles. Documents types requiring authentication may be birth certificates, death certificates, marriage licenses, divorce decrees, and adoption. Transactions requiring authentication of documents or data related to the documents may be applications for a marriage license, adoption, a passport, insurance or driver's licenses. RFID tags may be embedded in secure printed personal documents by a paper manufacturer when the paper is printed or may be attached to the document as part of a computer print process. Some combination of factory printing and local computer printer printing may be applied to read and store all elements of the EPC. The certified copy printing process may write and store a serial EPC number on the tag, or the serial number may be attached to the paper during the paper printing process and the IT process reads the serial number stored in the RFID and associates it with the data file/request for the document. In either embodiment, the certified document printing process will provide rules and processes for when and how to read or store Electronic Product Code information, dependent on whether an RFID tag is embedded in the paper at paper print or will be added when the document is printed on a local printer. The unique Electronic Product Code is recorded and made available to third parties through an Electronic Product Code database available on the Internet. In most instances, the RFID tag may store not only the PI with unique numbers identifying transactions but may also store related data such as user name or Social Security Number. The amount and types of data stored in the RFID tag or linked and accessible via remote databases is a fluid definition and may change as new RFID technology allows more data to be stored and accessible in the RFID tag. In other instances, the EPC number may point to an external Electronic Product Code Database which can identify the location of a data record users can access or associate other business processes with. The IT system may further or alternatively optionally employ RFID write systems and/or read systems whereby information may be written into RFID tags and read from RFID tags.

In a first preferred embodiment of the method of the present invention, an authenticating agent (e.g., person, official, software agent, or agency who is a trusted source or conduit of authenticating data), collects, records and stores data documenting official birth, adoption, marriage, divorce or death registration events. When requests are made to the authenticating agency for certified copies of such official information, the authenticating agent utilizes RFID technology to create and attach a unique intelligent Electronic Product Code in each instance a certified copy of an official record is printed. Said EPC can identify and allow third parties to authenticate documents and information associated with said documents. The EPC may comprise or be an Electronic Product Code as issued by EPCglobal that may be used to access information stored on a network of computers that may include the Internet. The Electronic Document Code may also point to the location of the database record(s) used by the authenticating agency as a data source for creating the certified document, and access codes determining whether such database records or RFID data fields can be read or written to in transactions requiring validation of identity. The IT processes can include maintaining an audit trail of entities requesting validation of identity in data transactions using such documents to validate/verify the data on the document. The present invention enables the recording of subsequent life event records related to the individual to update Personal Information stored in the RFID chip and may also notify the source authenticating agency or agent maintaining a life event record such as a birth registration record of a subsequent life event record, such as marriage, divorce or death.

In the second preferred embodiment of the method of the present invention, an authenticating agent collects, stores, associates and authenticates unique identity data with stored records used as a data source for creating and printing certified documents. The same or another authenticating agent may then include a digital representation of said unique identity data such as DNA or other biometric data and use such data to authenticate the individual who owns the documents in subsequent transactions. In the second embodiment of the invention, the invention associates an RFID tag with a printed document or card or semiconductor device which uniquely codes and identifies the source agency or agent authenticating and certifying life event records whereby said chip can be embedded within a human and used for a unique digital ID If global positioning system ("GPS") data or other IT information (user code attached to a street location) is available and associated with a specific life event document, the system may include IT processes to find/locate documents using normally acceptable GPS processes.

The present invention may optionally protect against identity theft by monitoring requests for copies or verification of life event documents by third parties of vital record documents, birth, death, marriage, divorce or adoption and reporting such information to a public source, i.e., a credit bureau.

The authenticating agency may also elect to distribute authenticated data electronically rather than in paper form. The authenticating agency or agent use the RFID tag as a reference to data stored on a network rather than printed on a paper document; RFID processes may require passwords or other identifying data for third parties to access remote data or other digital data stored in the RFID tag. The IT Processes of certain alternate preferred embodiments of the method of the present invention may then read the authenticating codes and keys, which may include a password, validate the code, keys and password within the RFID tag, access hidden identity data stored in the RFID tag or in a remote database according to rights and privileges assigned by the authenticating agency. An optional IT process may thereupon develop processes and procedures enabling individuals to authorize electronic access to identity data stored in the RFID tag or stored in a remote database for subsequent use/inclusion in other identity documents and authenticating agents to assure an authenticated agent provided such data.

Unique digital identity data may also be protected or authenticated by a system using a secret code in combination with biometric data. Such digital data may be included and authenticated with birth registration records and electronically included in vital record documents and files, and subsequently authenticated and made available for inclusion in auxiliary identification files, such as passports or drivers licenses. Applications for such auxiliary documents can include matching or extracting the applicant personal biometric/DNA identity data as electronically collected and authenticated in the birth certificate. Such matching can be done by reading or otherwise accessing electronic files embedded in the birth certificate, or matching can be done by accessing an external database, such as the state's birth record file.

A third alternate preferred embodiment of method of the present invention may be used to by third parties requested to provide benefits, services, or monetary payments to an individual to authenticate documents which look like certified copies of vital record document are accurate and authentic and have not been revoked. All states and some counties of the United States maintain electronic and paper records of vital records, birth, death, marriage, divorce and adoption. Certified copies (or other copies appearing to be authentic) of these records are the basis for validating/authenticating many individual benefits, services and monetary payments. For instance, when an individual applies for a driver's license or a passport, they may be requested by a governmental authority or its agents to provide a certified copy of a birth certificate to validate individual identity. Vital records are often printed on special purpose preprinted paper with the state, county or other authenticating agent seal. The uses of special purpose paper which may include a preprinted serial number or bar code are existing—but only partially effective—efforts to eliminate counterfeit documents. Courts also have a requirement to print authenticated documents for certification and authentication of marriage, adoption or divorce documents. The Personal Information codes may also include a unique digital code for each instance of a vital event document, making such document smart and interactive Third parties can now develop automated processes to read the RFID tag embedded in the smart document to authenticate if the document is accurate and has not been revoked.

The authenticated data can be read and automatically populate the requester database from either data in the RFID tag or data from the authenticating agency database. The authenticating agency has the right to revoke the information originally provided in the identity documents in case of errors, name changes, death or other circumstances. Such revocation will become known to the entity requesting verification/validation of the identity documents when the validation/verification of the identity data is requested from the authenticating agency. Entities requesting validation of data can also set a flag with the authenticating agency requesting notification if at a future time information validated is revoked or changed by the authenticating agent.

In another embodiment of the method of the present invention, an audit trail can be kept identifying all places where a birth certificate or other life event is provided as proof of identity.

Identity Theft Management

A record of requests for copies or changes to life documents or records, such as individual birth, death, marriage, adoption or divorce records and other vital or medical records, can be shared with other IT systems or business process. For instance, information about the request for a birth certificate or a death certificate can be sent to a credit-reporting bureau. An individual can optionally review his credit report and see a record of all requests for a copy of vital records Electronic Corporate Seals In another embodiment of the present invention, an authenticating agent, system or agency may electronically sign and authenticate the birth certificate documents using an RFID tag whose coding structure enables third parties who process the RFID tag to identify what authenticating agency created the certified document. The invention utilizes the RFID tag to be recognized by legal authorities to grant such documents the same rights associated with documents bearing a Corporate Seal. The invention does not bar the inclusion of Corporate Seal visible on the printed paper. Rather, the RFID tag adds an anti counterfeit layer to the paper document.

Certain yet alternate preferred embodiments of method of the present invention may optionally provide in combination or singularity the following features, aspects or capabilities:

1. Database Pointer. The intelligent RFID tag embedded on the authentic documents may include an EDC number used as a unique transaction identifier. That unique identifier enables parties to directly access external databases storing related data. Such database pointer eliminates the need for service validation processes to enter and match data fields from the authenticating agency database. Instead, such unique Electronic Product Code can point directly to data fields stored on a network and available in various third party service processes.

2. Document Pointer. The EPC may also point directly to a personal document. For instance, the Social Security may desire to authenticate a Birth Certificate is authentic before providing retirement benefits. Today, such authentication process would require the SSA to request authentication of the birth certificate by entering data from the birth certificate, sending such information to the state identified on the birth certificate, and initiate a search of the state database to find a matching record. The Electronic Product Code enables the SSA to directly access a data file containing the personal document.

3. Unique Electronic Product Code for all documents where third parties desire to ascertain the document is authentic. The unique Electronic Product Code enables the requestor to validate the documents and related data is accurate and authentic.

4. Eliminates data entry. Electronic RFID tags can be read and data stored in the RFID tag to automatically populate third party service or benefit processes, eliminating the requirement to manually enter a name or other identifying data into the identity database. This eliminates the need for someone's Social Security Administration number to be maintained in a requestor database or displayed on a screen.

5. Establishes the birth record as the primary record for authenticating digital identity. DNA is a critical piece of evidence for establishing identity. Today, various federal agencies can collect DNA about the same individual and store it in separate databases. No single agency has been designated as the single repository for identity and DNA information. The method of the present invention may be employed to expand the existing birth, death and other vital record business processes established by authenticating agents to collect and distribute DNA data and the name of the individual the DNA belongs to 6. Authenticates identity ID in off line transactions. Most credit cards have added data to a credit card account. This code is not printed on a credit card transaction slip. Therefore if someone is trying, without authorization, to use a credit card in an off line transaction, they cannot do so unless they have your credit card in their physical possession. The RFID tag on an identification document can be used in the same manner, providing the same secondary level of authentication credit card processing requires for off line transactions involving identity documents such as on line applications for drivers licenses or marriage licenses.

7. Tracking authentic documents. RFID tag technology will optionally enable location tracking of authentic documents. RFID readers will be extensively deployed geographically. Such readers can silently detect the presence of RFID tags on authentic documents and log the location where the RFID tag was read.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
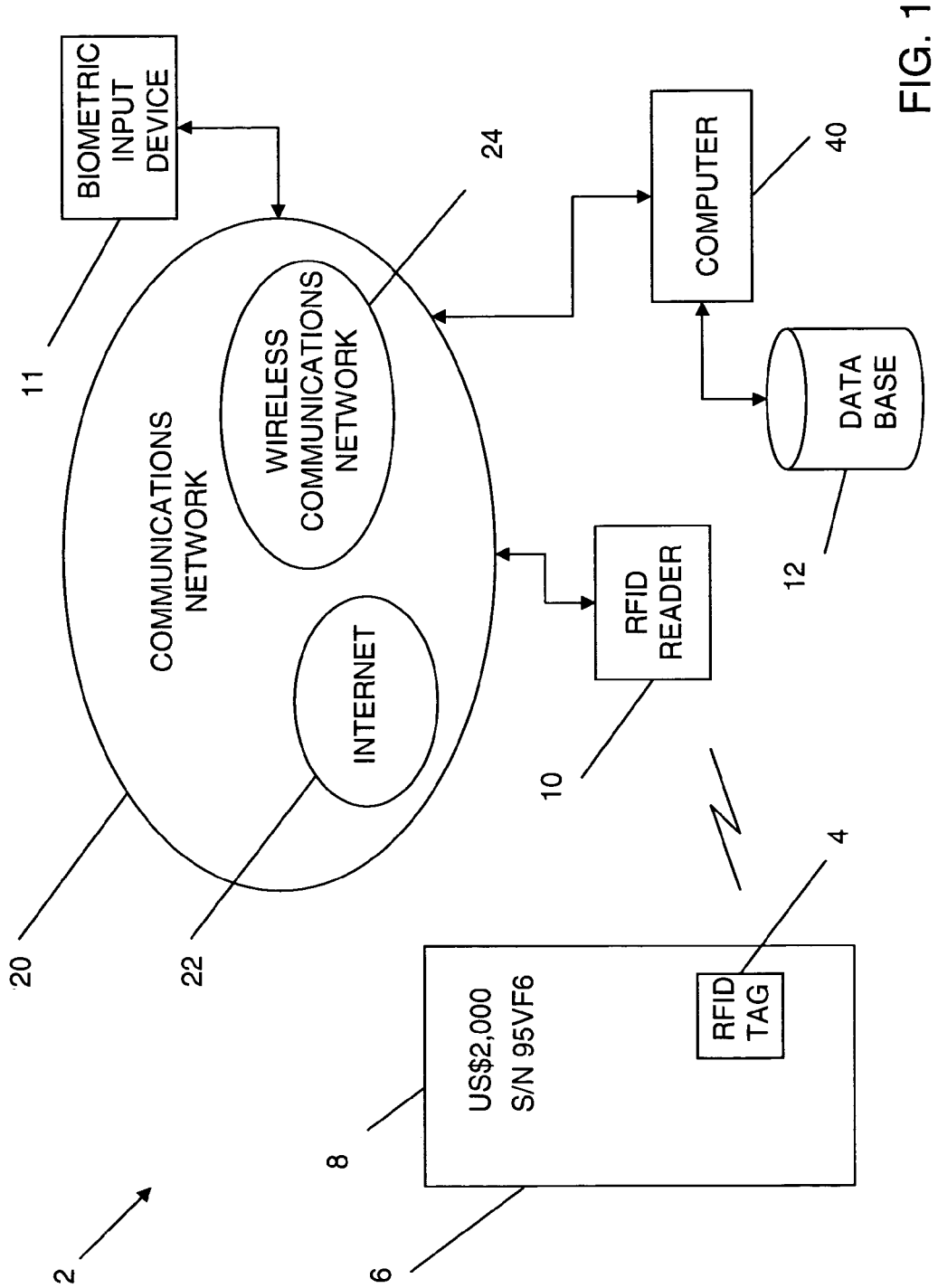
FIG. 1 is an illustration of a document bearing an RFID circuit tag coupled with a substrate with which a preferred embodiment of the method the present invention may be implemented.

Referring now generally to the Figures and particularly to FIG. 1, FIG. 1 is an illustration of preferred embodiment of the present invention 2, comprising an RFID circuit tag 4 attached to a substrate 6. It is understood that in certain alternate preferred embodiments of the present invention the substrate 6 may be one of a variety of suitable print media known in the art, e.g., paper, fabric, plastics, wood products, metal foils, and etc. The document 2, or RFID doc 2, may be or comprise a financial instrument, a document, a legal document, a coupon, a Uniform Commercial Code ("UCC") document, a certified document, a document recorded by a notary public, a document certified as a valid copy by a government agency, a tax document, an ownership document, a payment document, a lien document, a payroll document, a debt document, a credit document, an ownership transfer document, a real estate title document, an asset title document, a motor vehicle title, a check, a personal check, a payroll check, a cashiers check, a certified check, a credit card, a credit note, a promissory note, a debit card, a debit note, a rebate, a rebate coupon, a monetary note, a currency bill, a ticket, an airline ticket, a train ticket, a bus ticket and/or a contract. The substrate 6, or sheet 6, includes a visual pattern 8, where the visible pattern may be a printed image, a typewritten image, a bar code image, an embossed image, an ink image, a handwritten image, a hand drawn image, a computer generated image, a heat imprinted image, an etched image, a painted image and/or a chemically treated image.

An RFID communications device or "reader" 10 is used to read and/or write data from the RFID tag 4. The transmitted data may be information used to (1) validate or authenticate data, (2) validate or authenticate an identity of a conduit, source, or destination of transmitted data, (3) or to authenticate or validate permission or authorization to read from and/or write onto the RFID tag 4.

Figure 2:
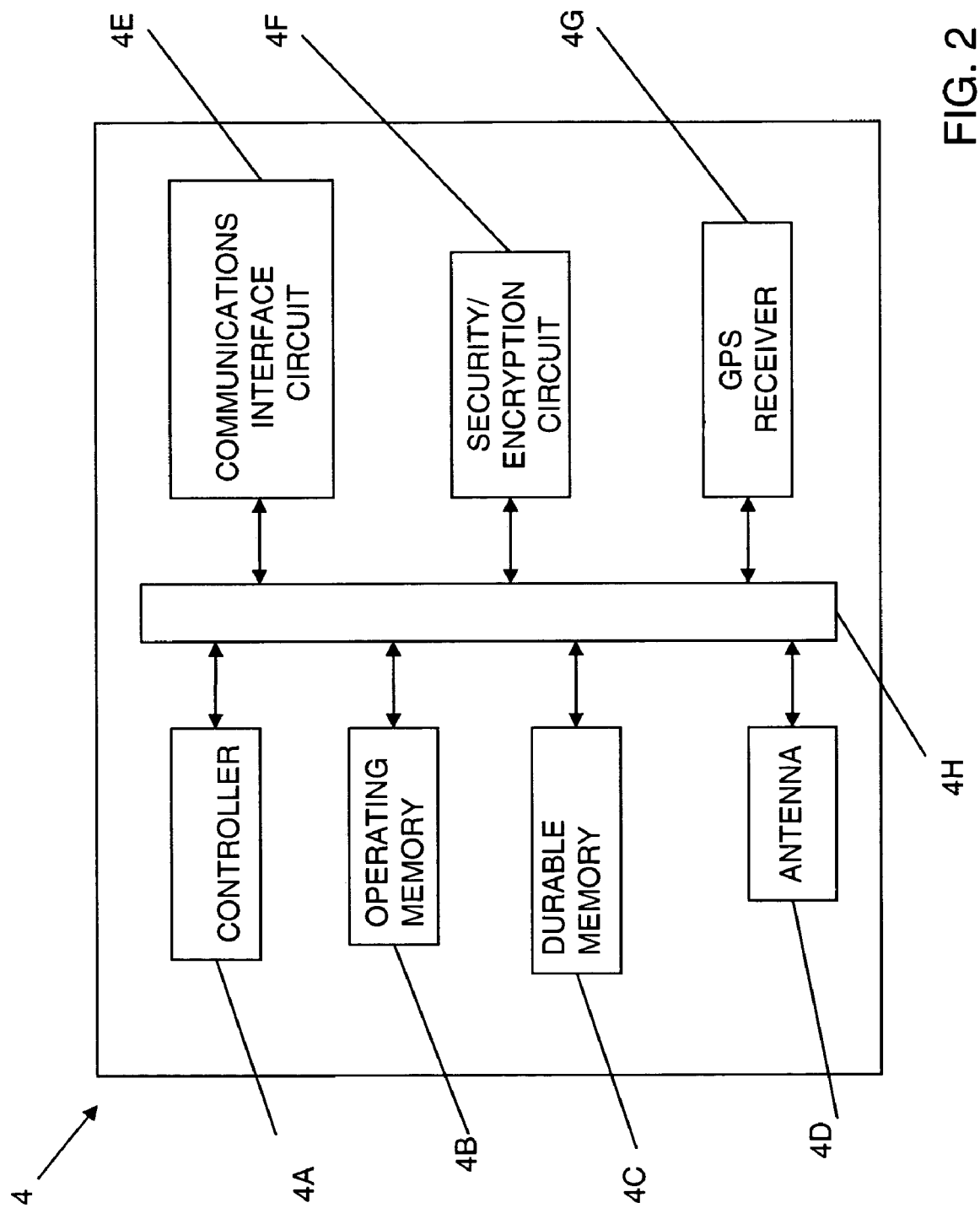
FIG. 2 is a schematic diagram of the RFID circuit tag of FIG. 1.

Referring now generally to the Figures and particularly to FIG. 2, FIG. 2 is a schematic diagram of the RFID circuit tag 4 of FIG. 1. The RFID circuit tag 4, or RFID tag 4, has a controller 4A, an operating memory 4B, a durable data memory 4C, an antenna 4D, a communications circuit 4E and a security/encryption circuit 4F. Data identifying and authenticating the identity of the RFID 2 tag are stored in the durable data memory 4C. In certain alternate preferred embodiments of the present invention the RFID tag 4 may comprise logical circuits and/or programmable logic circuits that direct aspects of the operation of the RFID tag 4 and may partially or wholly execute the operations of the RFID tag 4 without reliance upon a software program stored within or transmitted to the RFID tag 4. In the preferred embodiment 2 of FIG. 1, the RFID tag 4 has a software program at least partially stored within the durable memory 4C, and relied upon to direct the operation of the RFID tag 4. The antenna 4D receives radio signals from the RFID reader 10, or reader 10, and delivers the received signal to the communications circuit 4E. The communications circuit 4E digitizes the received signal and transmits the digitized signal to the controller 4A. The controller 4A may then access the security circuit 4F to authenticate the identity of the reader 10 and to determine if the reader 10 is authorized to request information from, or write information into, or otherwise direct the operation of the RFID tag 2. Information concerning the reader 10, and the instant attempt to access data stored in the RFID tag 2, may be recorded by the RFID tag 4 in the data memory 4C. The antenna 4D may be directed by the controller 4A to transmit radio signals to the reader 10, wherein the radio signal includes data stored in the data memory 4C. The communications circuit 4E acts as enabler for these transmissions from the RFID tag 4 and provides a transmittable signal to the antenna 4D. It is understood that the prior art and conventional techniques of RFID circuit design and operation provides numerous alternate variations of RFID tags that may perform in accordance with the requirements of the method of the present invention, and that the details of the design and operation of the RFID tag 2 are illustrative and not limiting to the scope of the claimed invention.

An optional GPS receiver 4G is coupled with the controller 4A. The GPS receiver 4G may receive signals from the global positioning system ("GPS") and process said signals to generate a location information that indicates the geographic position of the GPS receiver 4G. The GPS receiver 4, preferably located in a nearby reader but possibly attached directly to the tag, then communicates the location information to the controller for storage in the data memory 4C. The location information may be associated with other information stored in the data memory 4C, such as (1) text messages received RFID reader 10, or (2) an identity of a requester of data associated with a request received at approximately the same time by the RFID tag 4 that the GPS signals used to generate location information were received. The controller 4A, the operating memory 4B, the writeable data memory 4C, the antenna 4D, the communications circuit 4E, the security/encryption circuit 4F and the GPS receiver 4G communicate via a communications bus 4H.

Figure 3:
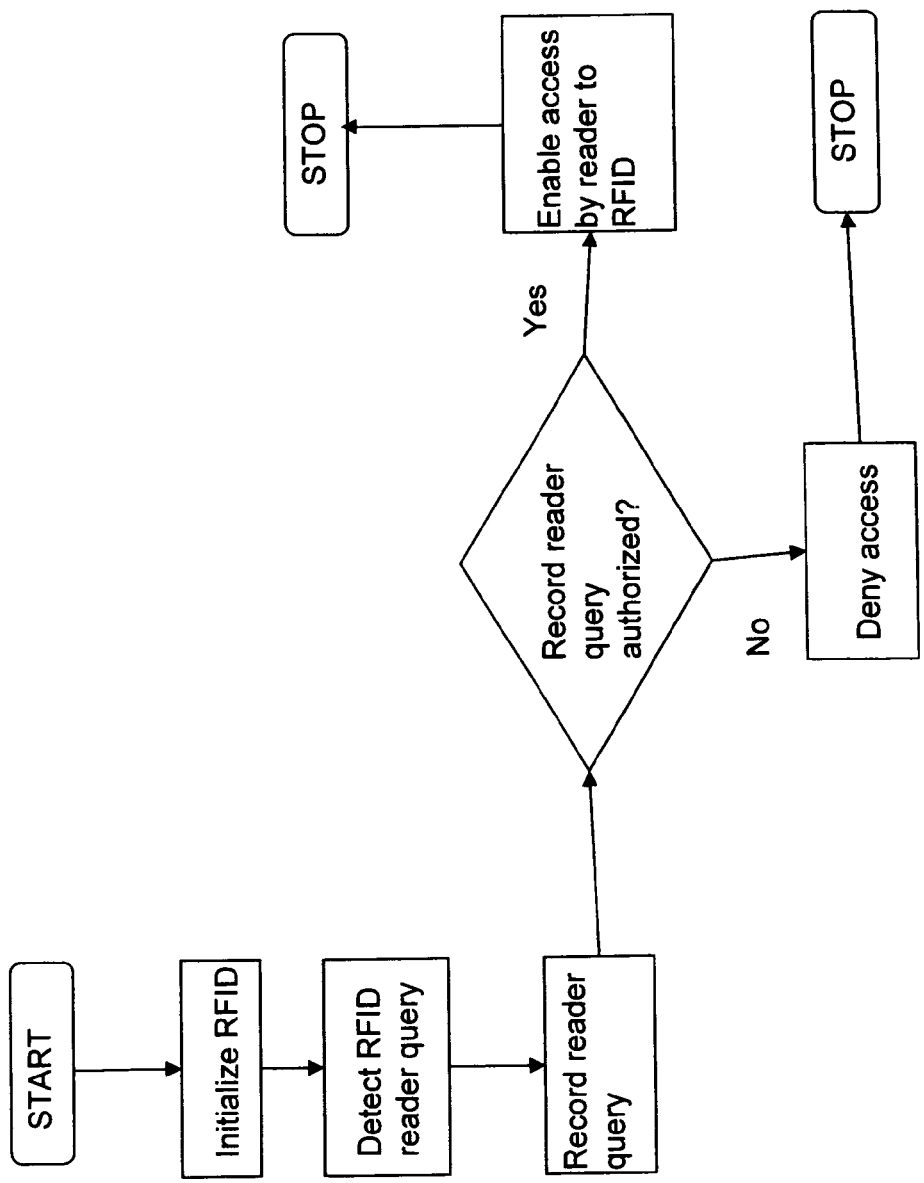
FIG. 3 is a process and software flow chart of a preferred embodiment of the method of the present invention that may be implemented using the RFID circuit tag of FIG. 1

Referring now generally to the Figures and particularly to FIG. 3, FIG. 3 is a process and software flow chart of a preferred embodiment of the method of the present invention that may be implemented using the RFID circuit tag of FIG. 1 and where the RFID circuit tag 4 is coupled with the document of FIG. 1. The RFID tag 4 is initialized by storing initialization data in the data memory 4C and optionally also storing an operating software program in the durable memory 4C. The initialization data transmitted to and stored in the RFID tag 4 may comprise information related to persons or entities, to include an employer tax identification number or biometric data. The biometric data may be sourced or originated from an information requestor's DNA, or hand or fingerprints, or iris or pupil structures, or voice recordings, or other suitable biometric data known in the art. The RFID tag 4 subsequently detects an attempt to access data stored in the data memory 4C by the reader 10. The reader 10 may in certain preferred embodiments of the present invention provide biometric data acquired from a human being via a biometric input system 11 in an effort to authenticate the identity of the requester of the data stored in the RFID tag 4. The RFID may optionally create a record of any communications attempt by the reader 10 and store this record in the data memory 4C. Records of communications attempts by various readers 10 that document the identity of requestors of the data may optionally be stored and used as an audit trail to record the identity of agents having attempted to access, or successfully accessed, the data stored in the RFID circuit. The reader 10 may use biometric data and/or a secret code to gain access to the data stored in the RFID tag 4. The RFID tag 4 may then process the biometric and secret access codes via the security circuit 4F to determine if the reader 10 is authorized to access data stored in the RFID tag 4. The RFID tag 4 may in certain preferred embodiments of the method of the present invention access data stored in a remote data base 12 to authenticate the identity of the reader 10, or to authenticate the identity of a person requesting access to the data of the RFID tag 4, and to determine if the reader 10 and/or the requesting person is authorized to receive the data. This procedure may also be followed when the reader 10 is attempting to write data into the RFID tag 2. Where the RFID tag 4 determines that the reader 10 has not provided the necessary information, the RFID tag 4 will deny the information request, record information concerning the failed attempt by the reader 10, and return to a sensing state. In certain still alternate preferred embodiments of the method of the present invention the RFID tag 4 may attempt to transmit a message to the remote database 12 via the reader 10 and a communications network 20. The communications network 20 may be or comprise the Internet. The message may be a revocation or alteration of a validity state of the document 2. The document 2 may be placed in one more validity states by an authority, where the validity states may include (1) a time limit to validity, (2) a maturity state wherein the financial document may be tendered for payment, (3) a revocation by the issuing authority or an another authorized authority, (4) an obligation state, (5)

an encumbrance state, or (6) other suitable validity states known in the art and related to one or more characteristics of a financial instrument or document.

Figure 4:
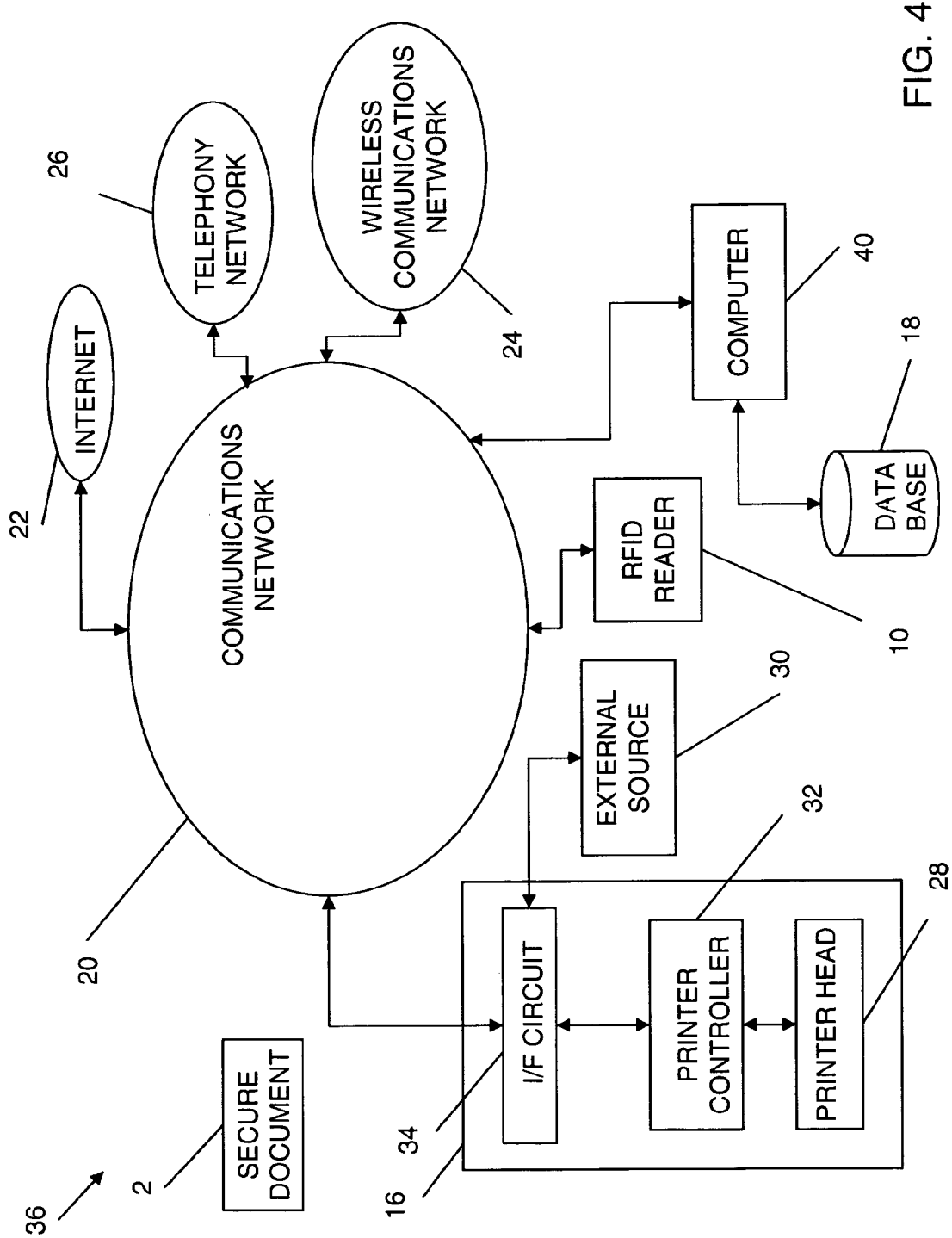
FIG. 4 is a yet alternate preferred embodiment 14 of the present invention comprising a printer, a database communicating with the printer via a communications network and the RFID document of FIG. 1.

Referring now generally to the Figures and particularly to FIG. 4, FIG. 4 is a yet alternate preferred embodiment 14, or print system 14, of the present invention comprising a printer 16, a database 18 communicating with the printer 16 via a communications network 20 and the RFID document 2 of FIG. 1. The communications network 20 may be or comprise via the Internet 22 and/or a wireless electronic communications network 24, and/or an electronic telephonic network 26. The substrate 6 is inserted into the printer 16 whereby the visual pattern 8, as shown in FIG. 1, is formed on the sheet 6 by a printer head 28. The reader 10 accepts data from the remote database 12 via the communications network 20 and/or a local source 30, such as a keyboard, and transmits the data to the RFID tag 4 to initialize the RFID tag 4 or to update the data stored in the RFID tag 4. A printer controller 32 receives data and instructions from the remote database 12 over the Internet 26 and via an interface circuit 34 and directs the printer head 28 and the reader 10 to transmit and print data to the document 2 in accordance with the received data and instructions. Alternatively or additionally, the printer controller 32 may optionally receive data and/or instructions from the local source 30 and direct the printer head 28 and the reader 10 to transmit and print data to the RFID doc 2 in accordance with the received data and instructions. The optional or alternative local source 30 is communicatively linked with the printer controller 32 in order to provide data to the printer 16 for recording upon the substrate 6.

Figure 5:
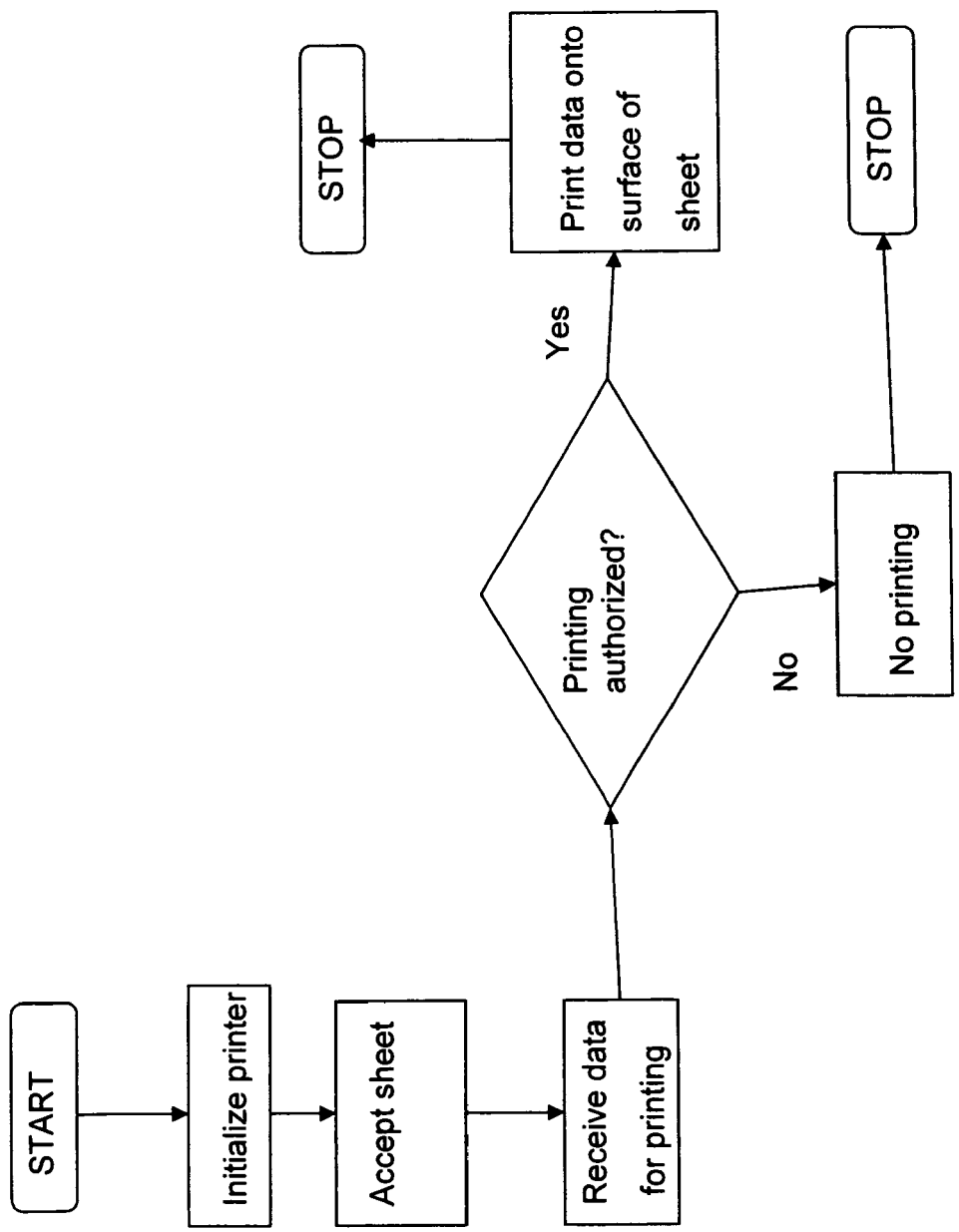
FIG. 5 is a process and software flowchart of an alternate preferred embodiment of the method of the present invention that may be implemented with the printer of FIG. 4.

Referring now generally to the Figures and particularly to FIG. 5, FIG. 5 is a process and software flowchart of an alternate preferred embodiment of the method of the present invention that may be implemented with the printer 16 of FIG. 4, the database 12, the document 2 and RFID circuit tag 4 of FIG. 1. The sheet 6 is placed into the printer 16, and data and/or instructions are received from the communications network 20 and/or the local source 30. The RFID tag 4 is then accessed and written into, and the sheet 6 is printed on by the printer head 28 under the direction of the printer controller 32 and in accordance with the received data and instructions. The sheet 6 may then removed from the printer 16.

Figure 6:
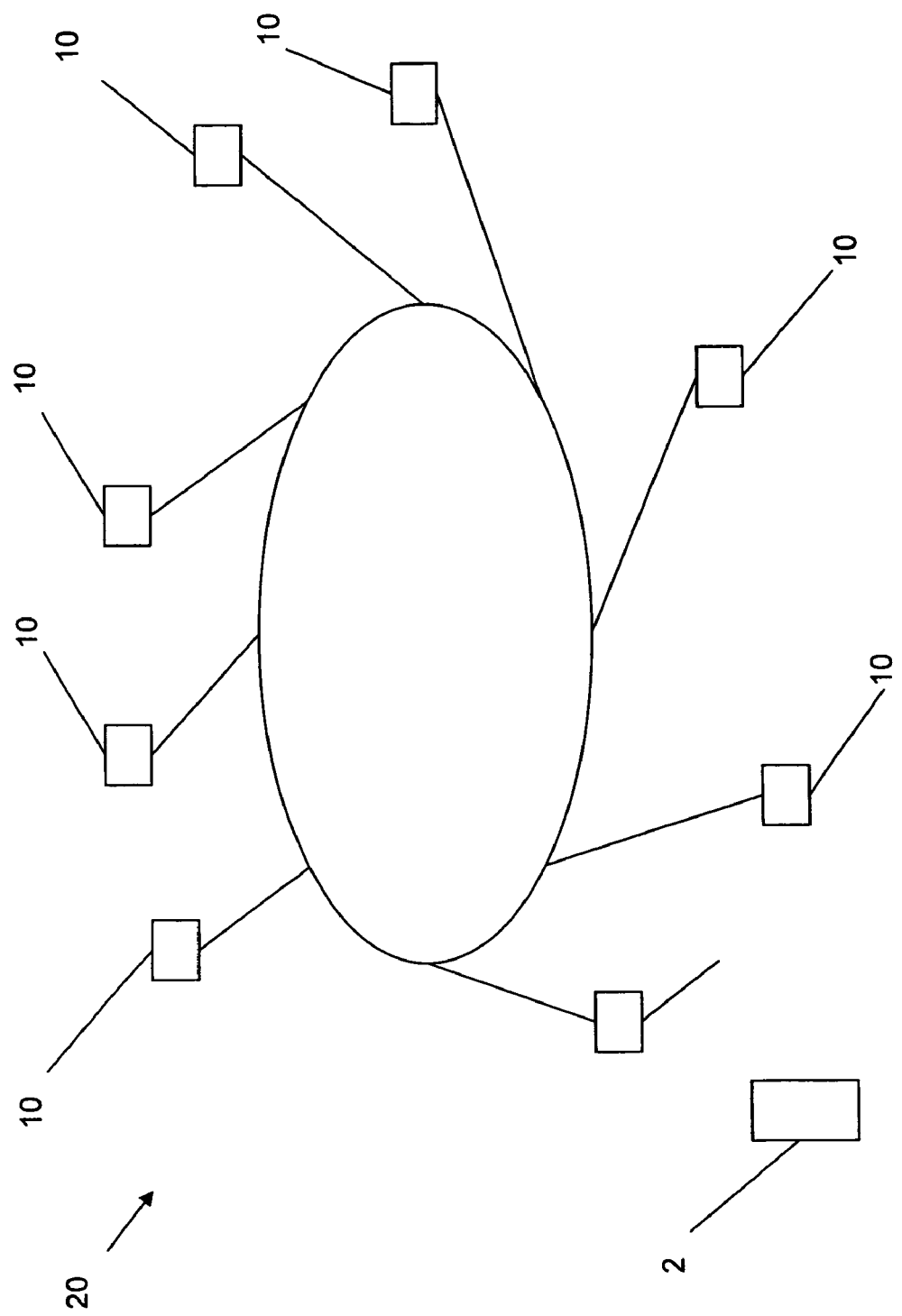
FIG. 6 is an illustration of a plurality of RFID readers of FIG. 1 geographically distributed and in communication over the communications network of FIG. 4.

Referring now generally to the Figures and particularly to FIG. 6, FIG. 6 is an illustration of a plurality of RFID readers 10 of FIG. 1 geographically distributed and in communication over the communications network 20 and tracking, or used to track or record, the physical position of the document of FIG. 1 over time and as the document 2, or RFID doc 2, is moved between different locations. The tracking of the RFID doc 2 made possible by the periodic or asynchronous contacts between the RFID doc 2 and one or more of the readers 10 reduce the potential for loss, misplacement and misuse of the RFID doc 2.

The method of the present invention optionally provides various alternate embodiments that may include, one, two, all or a plurality of the following aspects, capabilities, and/or components:

The use of a digital EPC stored in one or more RFID tags attached to printed documents and used by authenticating entities to uniquely identify a legal document as a document created by the authenticating agency and which third parties can access in automated business processes to ascertain if a document is authentic.

The use of a digital EPC stored in RFID tags 4 and attached to printed documents 2, by authenticating entities or by the authorization of an appropriate entity, to uniquely identify (1) a particular instance of a document created by the authenticating agency and (2) the data referred to in the document 2.

The creation of an EPC database stored and accessible on a computer network, preferably the Internet 22, which maintains the database 12 of documents 2 and the EPC printed on the document 2. A new EPC record record may be created or referred to by the authenticating agency for use in tracking each individual document. The EPC or EDC database may be proprietary to a particular authenticating agency or the authenticating agency may also decide to include the EPC in a public EPC or EDC database stored on a network and accessible by third parties to authenticate or process a document.

The ability for (1) parties who originate and issue authenticated documents and optionally (2) third parties who process such documents, to use an EPC database, an EPC database, and/or a combined EPC and EPC database, as a means of maintaining status about a document.

The use of a digital EPC on one or more printed documents to store data related to the document or transactions related to the document, and/or the ability to use the EDC code as a pointer to a remote database utilizing the EDC code as a common identifier linking transactions related to the document and accessible to third parties.

The structure of a common EDC which authenticating agencies and other parties can use to develop automated processes for locating and editing linked documents.

The use of digital EPCs, EDCs, secret codes, and hidden digital information attached to documents, by public or private agencies, to identify and certify legal documents as authentic. The use of a combination of digital EPCs, EDCs, secret codes, biometric information, and hidden information applied and attached various types of documents 2 used in commercial financial transactions by authenticating entities enabling third parties to validate the document 2 and data related to the document 2 is authentic, including checks, corporate shares, bonds, and currency.

The use of a EPC by the authenticating agency and third parties who process such documents 2 to utilize the EPC as a means of attaching other data attributes to the document, such as status codes. For instance, if a third party cashes a document 2 that is a check, the automated processes may include a data attribute to the EPC database indicating that a third party cashed the check 2.

The flexibility of the design of the EPC database, EPC database, and/or combined EPC and EPC database ("combined database") to store data or provide links to data depending upon the attributes of the RFID tag used. For instance, some RFID tags 4 would permit the EPC, EPC, and/or combined database to identify or be used to identify the authenticating entity and a unique serial number of a document or a particular unit of a type of product. Automated business processes may optionally access a record of the EPC, EPC or combined database, wherein the record was created when the document or unit was created in order to enable access to, and the ability to process, data related to the document or unit. In other instances, the design of the RFID tag may enable the authenticating entity and third parties to read, write and store document data within the RFID tag attached to, coupled with, or comprised within the document.

Generating or employing an EPC that may optionally be stored in either write-once read-many memory, or by other suitable devices or methods known in the art that can ensure that a stored EPC cannot be modified.

The use of RFID tags to identify and/or validate the authenticating agency who created the document, i.e. the originating agency, in a manner similar to or the same as (1) a corporate seal printed on a document does today to signify authenticity for the entity creating the document, and/or (2) an MICR coding on a check might imply or certify that a check was printed by a bank.

Associating a unique database record identifying the database record that an originating or authenticating agency, or its agents, used as source data, which can optionally be accessed or validated from a remote database Embedding the EPC code, where the EPC itself identifies, or indicates by reference to a database 12, (1) the identity or an identifier of an originating or authenticating agency of the document 2, (2) the printed transaction as either part of a preprinted form or added as part of a forms printing process hidden as digital data embedded or attached to the document 2, and (3) user profiles enabling third parties to access, read, write or update such hidden data.

A redundant system for both printing information onto the substrate 6, for example paper, and also storing either all or portions of the printing information in the form of digital data in a RFID tag 4 that is integrally embedded within the substrate 6.

Means for determining both the authenticity and accuracy of information printed on paper or other suitable flexible substrate material using data stored on an integrated circuit 4 embedded within the paper.

A composite electronic and paper document 2 wherein the printed paper document 2 displays data stored in an integrated circuit 4 embedded within the document 2.

Means for creating a three-way link between the printed or visually displayed information on a document 2, the electronic information stored in a memory embedded within the document, and/or the authority that generated or owns the document 2.

An integrated device 4 for both printing on paper 6, writing data into, and reading data out RFID tags 4 embedded into such paper 6 or other suitable flexible substrate 6 known in the art.

Figure 7:
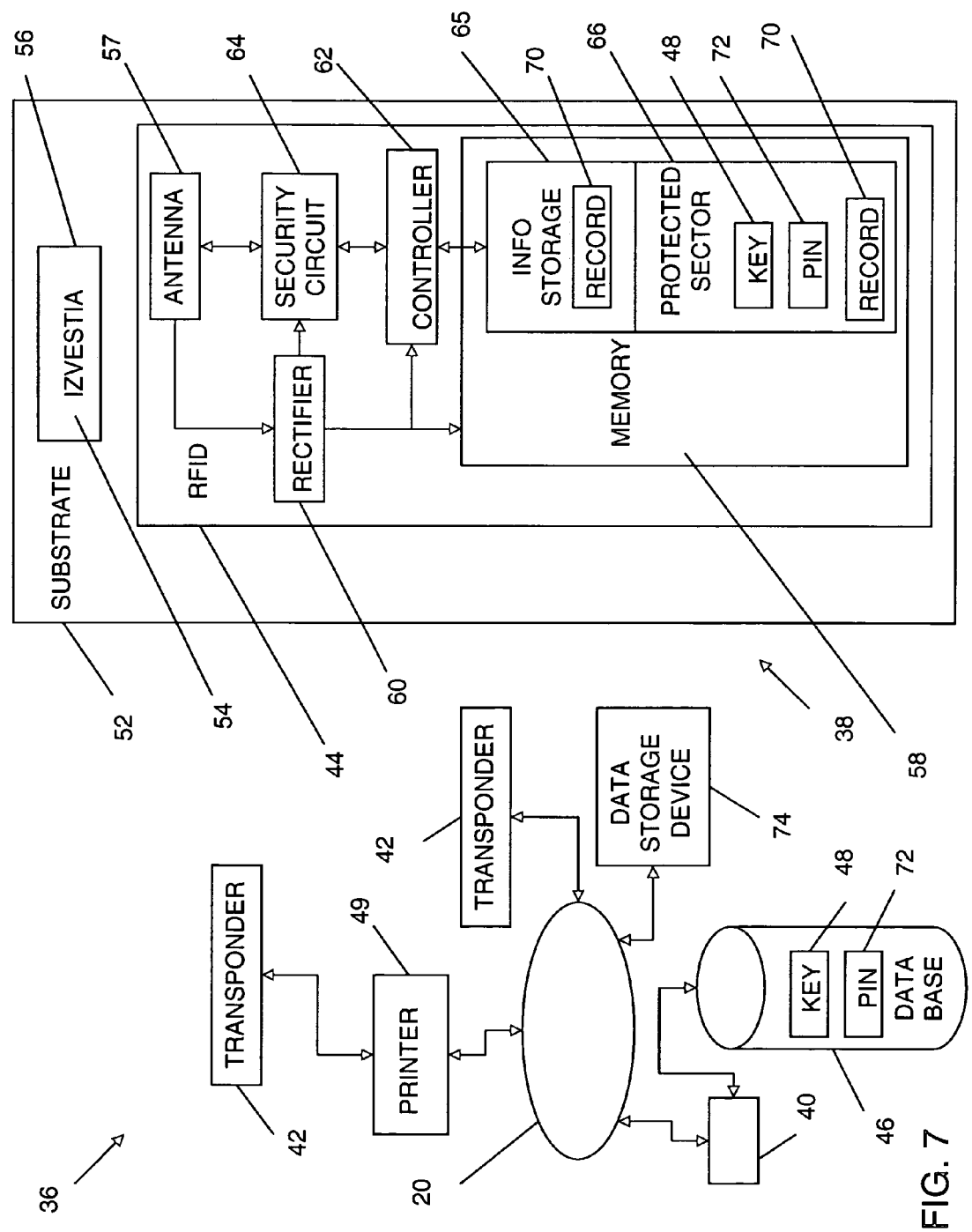
FIG. 7 is a schematic diagram of an alternate preferred embodiment of the present invention.

Referring now generally to the Figures and particularly to FIG. 7, an alternate preferred embodiment of the present invention 36, or document system 36, includes a secure document 38 and the computer communications network 20. A computer 40 communicates via the communications network 20 with an RFID transponder 42. The RFID transponder 42 may send and/or receive information from an integrated RFID circuit 44 of the secure document 38. The computer 40 contains a database 46, and the database 46 stores a first secret code or authorization key 48. The computer 40 may at least partially format, encode or encrypt messages at least partially on the basis of a mathematical process that employs the first authorization key 48. The term computer is defined herein to be or comprise a personal computer, personal digital assistant, workstation, networked computer, computer network or other suitable electronic computer, calculator, computational engine, or device known in the art. The first authorization key 48 may optionally include of biometric data or a checksum that may be computed upon the basis of at least one datum stored within the integrated RFID circuit 44 and at least a portion of the information printed on the secure document.

The document system 36 may further comprise the printer 16, where the printer 16 is communicatively coupled with the computer 40 and the printer 49 for adding visible information to a surface 50 of a flexible substrate 52. According to certain still alternate preferred embodiments of the method of the present invention, the document system 36 may include a means for printing information onto the flexible substrate, and the durable memory may store (1) a EPC, and (2) a print-time key, wherein the print-time key is written into the durable memory at approximately the moment that visible information is added to the flexible substrate. The printer 16 may further include an RFID transmitter, the transmitter for providing the print-time key to the durable memory.

The secure document 38 further includes the flexible substrate 52 coupled with the integrated RFID 44. The flexible substrate 52 comprises the surface 50, wherein the surface 50 visibly presents a sensory perceptible image 54, the perceptible image 54 for visual, tactile or sensory observation by a human being. The image 54 may be perceived by a human being to communicate an information 56, such as a financial value, exchange value, or face monetary value. The integrated RFID circuit 44 has an antenna 57, a durable memory 58, an RF rectifier 60, a controller 62 and a data security circuit 64. The RF rectifier 60 receives energy by radio frequency reception and provides the received energy to the RFID circuit 44 to execute internal and input/output communications and for other electronic operations. The term durable memory is defined herein to include a static or non-volatile memory, or other suitable memory or RFID memory component known in the art. The memory 58 includes an information storage sector 65 and a protected sector 66. The durable memory 58 optionally storing a record 70 in the information storage sector 65 and/or the protected sector 66, and the record 70 having of at least a portion of the information 58. The protected sector 66 may optionally have at least one datum not recorded within the information 56 recorded upon the flexible substrate 52. The protected sector 66 may store private personal information such as DNA codes or social security account numbers. The RFID controller 62 is coupled with the durable memory 58 and the data security circuit 64, and the controller 62 enables access to the durable memory 58 by the RFID transponder 42 as authorized by the data security circuit 64. The data security circuit 64 denies authority to the controller 62 to execute instructions received in a message, where the message is not formatted, encoded or encrypted at least partially in mathematical relationship to the first authorization key. The durable memory 58 may further optionally include information that relates to one or more codes that specify (1) a nation, (2) a province, county, city or other suitable subunit of nation, (3) serial number, or (4) transaction code.

The document system 36 may further comprise a plurality of secret authorization codes or keys 48, the plurality of authorization keys 48 stored within the durable memory 58 and the plurality of authorization keys 48 stored within at least one data storage device 74 communicatively coupled with the communications network 20. The plurality of authorization keys 48 arranged within a hierarchy, wherein the data security circuit authorizes the controller to execute an instruction received within a message, wherein the message is at least partially formatted in mathematical relationship to at least one of the plurality of authorization keys 48, and the data security circuit limits a scope of execution of the instruction or access to memory in accordance to the level of this particular authorization key within the hierarchy.

The secure document 38 may be an airline ticket, a train ticket, a bus ticket, a coupon or a financial note, such as a personal check, a payroll check, a certified check, a cashier's check, a note of currency issued by a governmental authority. Where the secure document 38 comprises a payroll check or a payroll card, personal check, or other financial instrument wherein the RFID 44 and or the surface 50 of the flexible substrate 52 may record a personal identification number 72 ("PIN"). The PIN 72 may be accessed by the RFID transponder 42 and/or the communications network 20 to reduce the incidence of cashing forged checks or unauthorized cashing of payroll checks. Information specifying or relating to the authorized amount of the payroll check may be provided on the flexible substrate 52 or within the RFID 44. The PIN 72 may be at least partially based upon, or mathematically expressing or derived from, suitable biometric data or voice data known in the art The RFID 44 may be coupled with the flexible substrate 52 prior to any printing or establishment of visual, tactile or otherwise sensory detectable images upon the surface 50 of the flexible substrate 52. The RFID 42 may also be coupled with the flexible substrate 52 at approximately the same time as a visually perceptible image is added or modified on the surface 50.

In still other alternate preferred embodiments of the present invention the secure document 38 may be a title to a real property and the identification data may be stored within the RFID 44 and/or the provided on the surface 50 of the flexible substrate 52. The identification data may be used to associate the secure document 38 with lien and encumbrance information stored within the communications network 20, whereby a user may investigate if a real property identified in, described by or associated with the secure document 38 has a lien or encumbrance recorded within a database linked to the RFID transponder 44 or the communications network 20.

The durable memory 58 may optionally store information related to an airline flight, the price of an airline ticket, or a travel destination. In certain still other alternate preferred embodiments of the method of the present invention, the durable memory 58 may store information related to a manufacturer, a product identifier, and/or a redemption value of a coupon.

Figure 8:
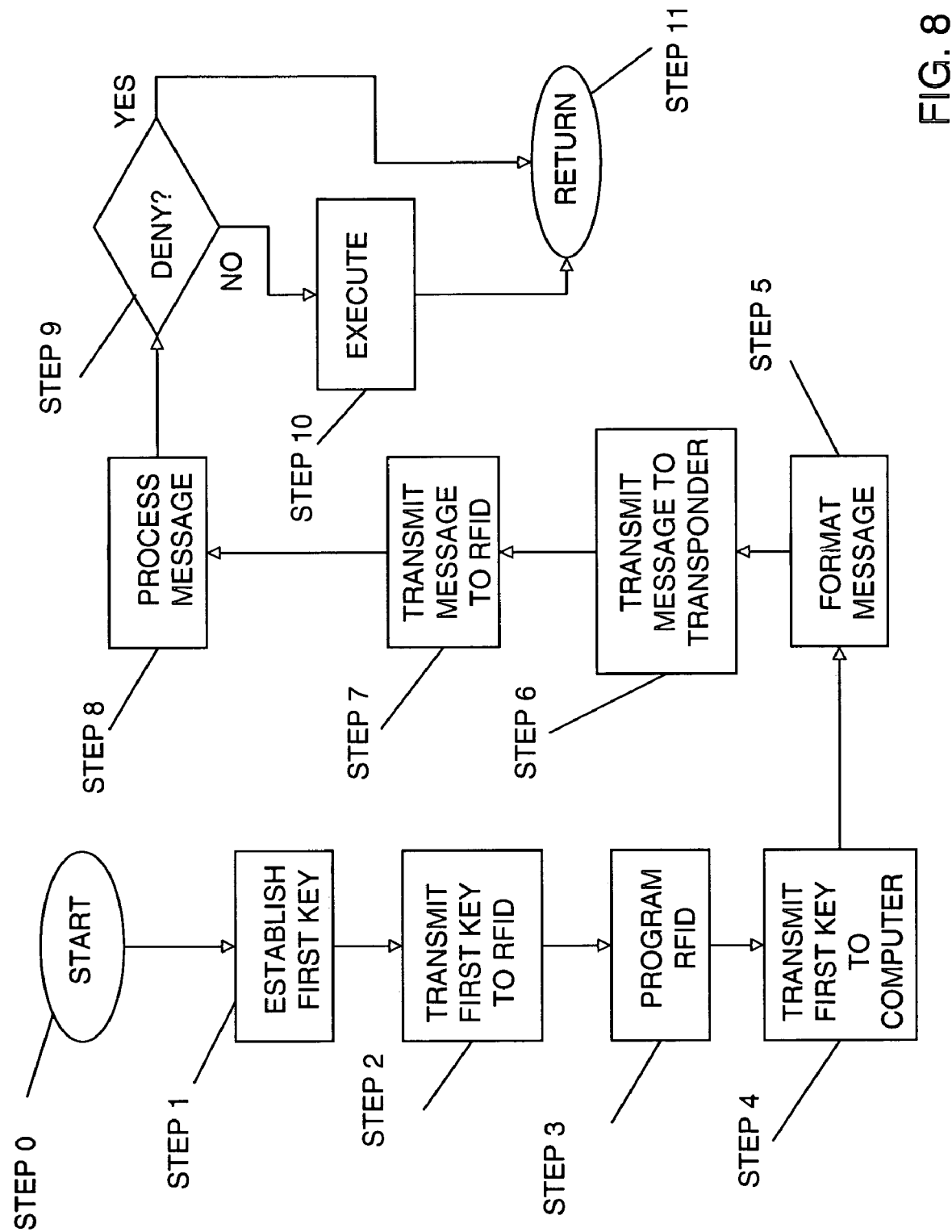
FIG. 8 is a flowchart of a method of the present invention that may be implemented by means of the preferred embodiment of the present invention of FIG. 7.

Referring now generally to the Figures and particularly to FIGS. 7 and 8, FIG. 8 is a flowchart of a method of the present invention that may be implemented by means of the document system 36 of FIG. 7. In STEP 1, the first authorization key is established. The first authorization key is provided to the RFID in STEP 2. In STEP 3 the privacy circuit of the RFID is programmed to identify messages formatted, encrypted and/or encoded at least partially on the basis of the first authorization key. The first authorization key is provided to the computer in STEP 4. In STEP 5 a message is formatted, encrypted and/or encoded at least partially on the basis of the first authorization key. The message is transmitted from the computer to the RFID transponder STEP 6. In STEP 7 the message is transmitted from the RFID transponder to the RFID. The privacy circuit processes the message in STEP 8 to determine if the message is formatted, encrypted and/or encoded at least partially in mathematical relationship to the first authorization key. In STEP 9, where the message is not formatted, encrypted or encoded at least partially in mathematical relationship to the first authorization key, authority is denied to the controller to execute instructions received in a message.

Figure 9:
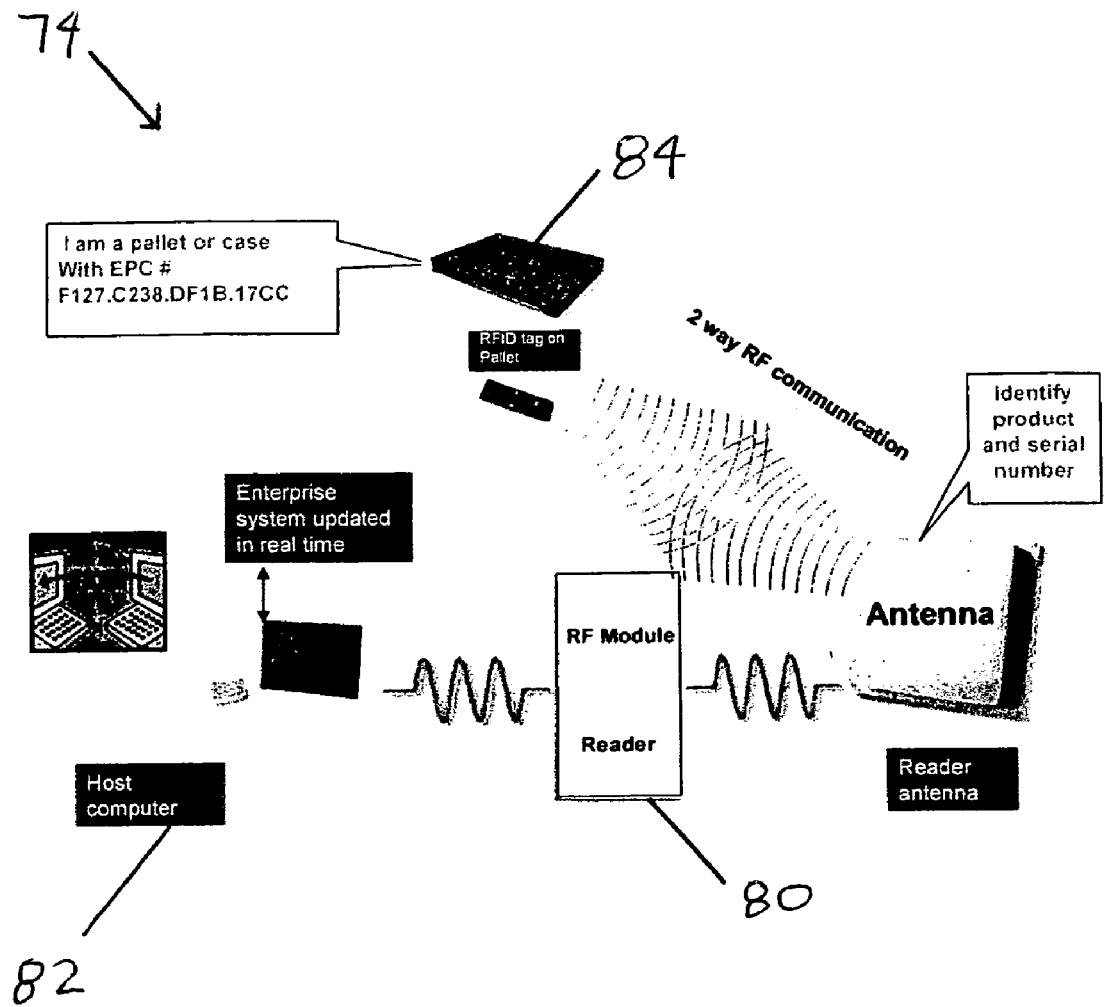
FIG. 9 illustrates an RFID system.
Figure 10:
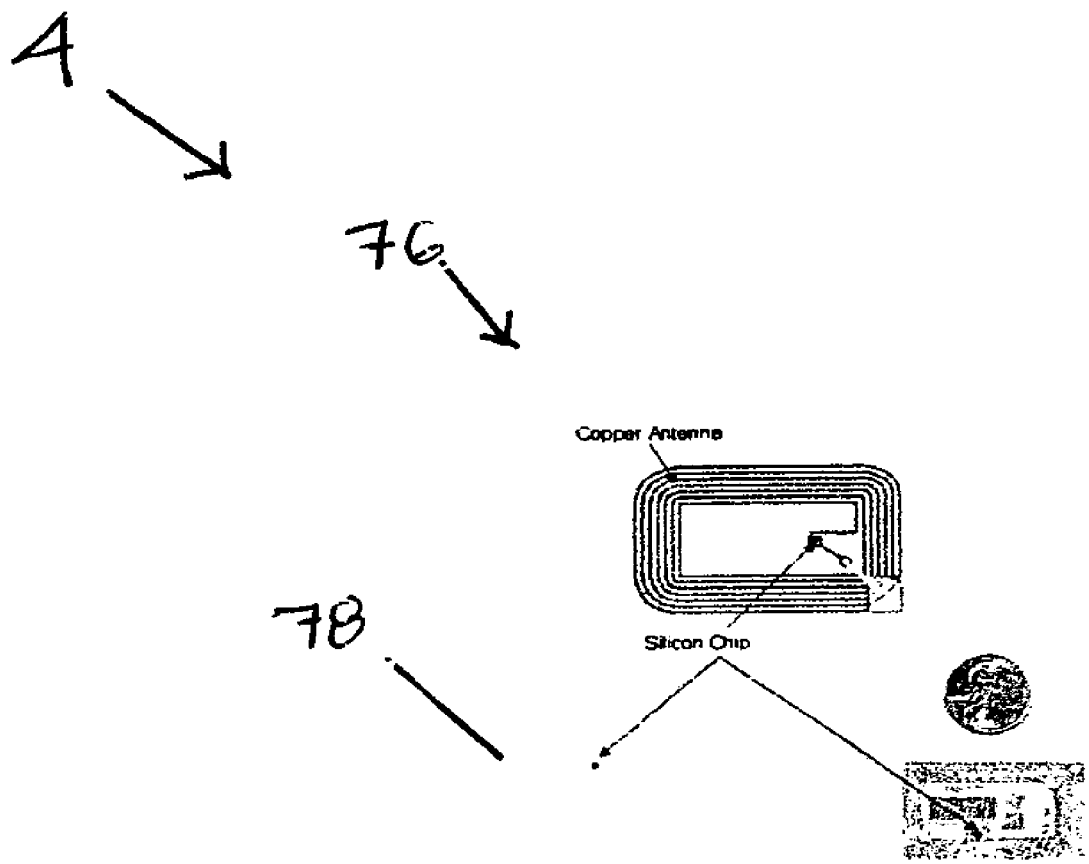
FIG. 10 presents an antenna and an integrated circuit optionally comprised within the RFID tag of FIG. 1 and/or the RFID tag of FIG. 9.

Referring now generally to the Figures and particularly to FIGS. 9 and 10, FIG. 9 illustrates an RFID system 74 and FIG. 10 presents an antenna 76 and an integrated circuit 78 of tag 4. The RFID system 74 operates with a reader 80 sending out electromagnetic signals to communicatively link with the tag 4. When the radio wave hits the tag 4 and the tag 4 recognizes the reader's signal, the reader 80 decodes the data programmed into the tag 4. The information is then passed to a server 82 for processing. The server 78 may be a computer. By tagging a variety of items, information about the nature and location of goods 84 can be known instantly and automatically.

The RFID system 74 includes two primary components, the tag 4 and the tag reader 80. The tag reader 80 and the tag 4 may communicate via radio frequencies, wherein the tag reader 80 is or comprises an RF reader 80. The tag 4 includes the integrated circuit 78 and the antenna 76. The integrated circuit 78 includes a digital decoder needed to execute the computer commands the tag receives from the tag reader 76. The integrated circuit 78 also includes a power supply circuit to extract and regulate power from the RF reader 76; a detector to decode signals from the reader; a transmitter to send data back to the reader; anti-collision protocol circuits; and at least enough EEPROM memory to store an EPC and/or EPC.

The system 74 may, in certain alternate preferred embodiments of the method of the present invention, use reflected or "backscattered" radio frequency (RF) waves to transmit information from the tag 4 to the reader 76. Since passive (Class-1 and Class-2) tags get all of their power from the reader signal, the tags 4 are powered only when the tag 4 is in the beam of the reader 76.

Semi-passive and active tags 4 have a battery to provide power to the integrated circuit 78. This greatly increases read range, and the reliability of tag reads, because the tag 4 doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Figure 11:
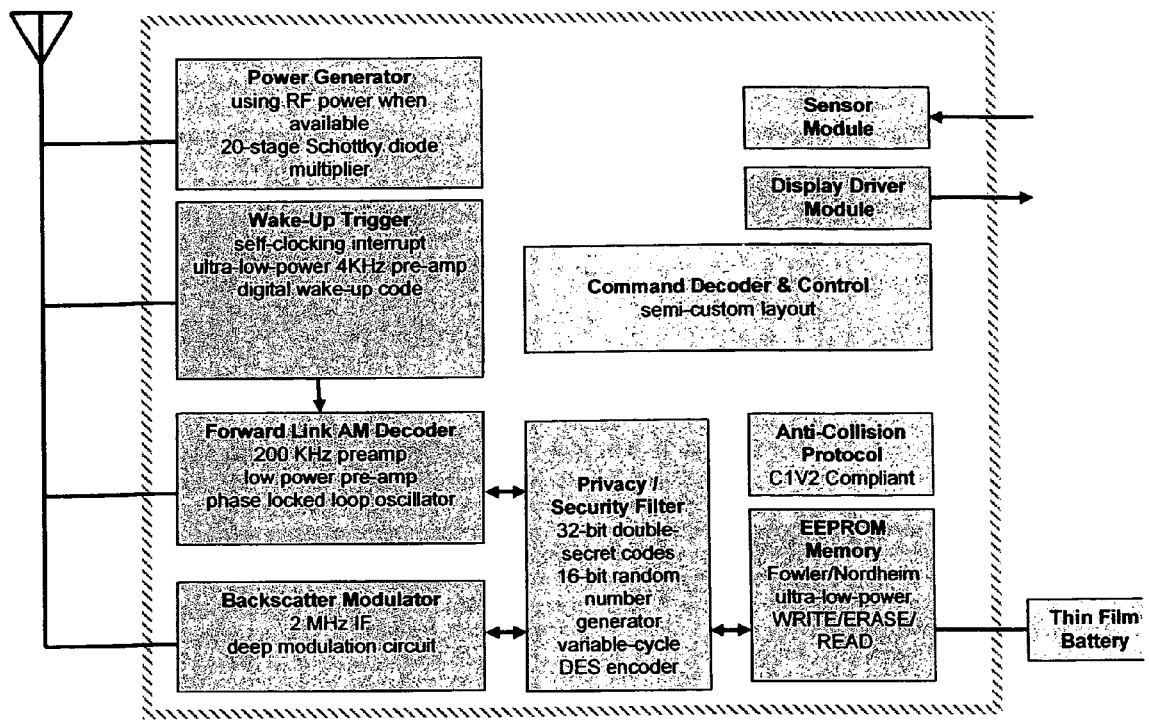
FIG. 11 provides a block diagram with details of the IC chip portion of the preferred embodiment of the RFID tag of FIG. 1.
Figure 12:
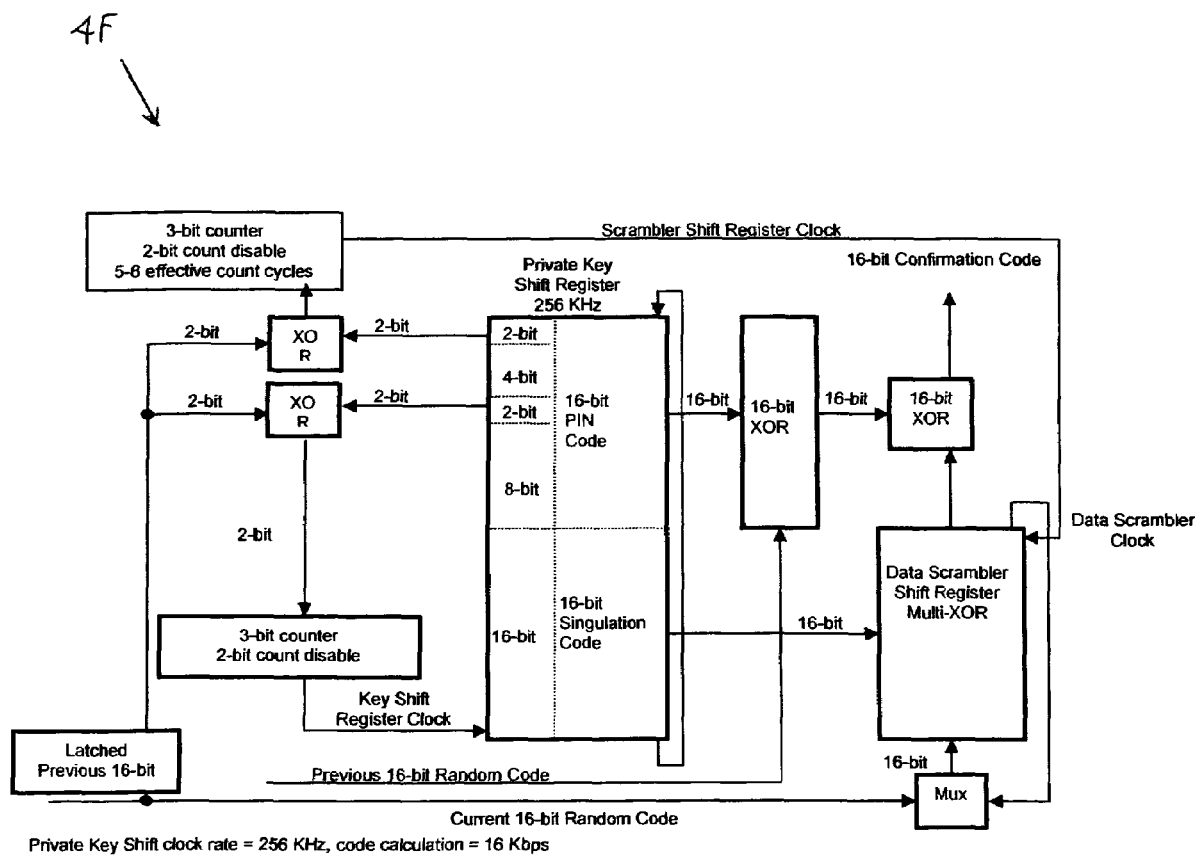
FIG. 12 is a schematic diagram of a data encryption circuit optionally comprised within the RFID tag IC chip of FIG. 11.

Referring now generally to the Figures and particularly to FIG. 11 and FIG. 12. FIG. 11 illustrates an alternate preferred embodiment 86 of tag 4, or RFID 86. FIG. 12 is a schematic diagram of a data encryption circuit 4F of tag 4 or RFID 86. FIG. 11 provides a block diagram for the secure RFID 86. Although important, the power generation and regulation circuits, the digital command decoders and control, sensor interface module, the new C1V2 interface protocol, and the power source, (all shown in green fill) are all based on industry-proven technology and are known to those skilled in the art.

Note that the RFID 86 includes a Class-2 or higher tag that includes highly-simplified, effective, security encryption circuit 4F like the one shown in FIG. 12, or other suitable encryption circuit known in the art. Class-2 and higher circuits show how existing symmetric double-secret-code encryption systems can be improved and simplified at the same time. To prevent eavesdropping, the 32-bit secret codes are never directly transmitted over the air link in either direction between the RFID 86 and the reader 76. Instead, the RFID 86 begins the exchange by spontaneously generating a 16-bit random number that is then sent to the reader 76. The reader 76 responds with a 16-bit random code of its own that it then sends to the RFID 86. Both the reader 76 and the RFID 86 then mix parts of this random code with other parts of their respective 32-bit secret codes using a "hash circuit". To deter attack against even a very powerful code-breaking attack, the hash function is repeated as many as 8-times, and both the number of hash-scrambling cycles, and the amount of register offset between each cycle, vary randomly under control of scrambled counter codes that are hidden from an outside observer. The counter codes themselves are a hidden function of both the random number and the secret codes. Finally, all data, commands, and addresses flowing across the air link between the tag and the reader are scrambled against the output of this hash generator. This includes the "personal information" data referred to in this invention. Unless all the bits are correctly decoded, both the tag and reader are designed to ignore the command and ignore the data.

Note also, that once the 32-bit secret code is initially either written into, or alternatively read out from, the RFID 86; these secret codes are never transmitted either into or out of the RFID 86 again. This prevents anyone from monitored these codes, copying them, and breaking the security. Instead, the double 32-bit secret codes are used to scramble and de-scramble the data but are themselves never transmitted in or out of the tag. The highly-asymmetric nature of the scrambling or "hash" circuit makes it impossible to deduce the secret code from the outputs that are sent back and forth to the tag.

Each RFID 86 may have a different randomly assigned secret code, so gaining access to one secret code provides no help in gaining access to other secret codes. Finally, it is obvious to those skilled in the art that the length of the secret code and the complexity of the scrambler circuit may be increased if necessary to increase the data security even further.

In certain still alternate preferred embodiments of the present invention the RFID tag 86 may contain a transponder, and the transponder may have recorded or enabled the recording of one, some, or all of at least the following types of electronic information that can be remotely accessed by an RFID reader 76:

a unique serial number;
public descriptive information about this currency or document;
a first level of hidden information used to determine the authenticity of this document;
a first secret code or "authorization key" and encryption circuit to protect this first level of hidden information;
a second level of hidden information that can also be used to determine the authenticity of the financial instrument; and
a second secret code or "authorization key", different from the first, to protect the second level of hidden information.

One, two, or more of the secret codes, serial numbers, EPCs, EDCs, or other suitable data or information stored within and/or outside of the RFID tag 4, 86 may used to protect against counterfeiting or unauthorized modification of or access to information stored or contained in the RFID tag 4, 86 may be an EPC or EDC. Additionally, while a unique code, serial number, authorization code, or other suitable information may be used to help discourage, inhibit or detect counterfeiting, an alternate use may be to enable tracking and counting money.

The hidden hierarchal information may optionally be useful to detect counterfeit currency and other counterfeits of other important documents and may be designed to operate at one, two or more hierarchal levels. The lower levels of password-coded information may be used to protect merchants, vending machines, bank tellers, and others from counterfeit currency. However the widespread use of such first level passwords, may make a first level password more vulnerable to compromise and fraud. Therefore the first level of electronic password security may be backed up with multiple higher levels of authentication security, each level of security optionally comprising an independent security code or plurality of codes. In certain preferred embodiments of the present invention, millions of merchants may have access to the first level password codes, while only a few hundred thousand bankers will have the second level security password codes. The second level security codes may thus more securely be used to test the currency with both first and second level codes. And an even smaller number of entities, such as regional banks, may back up the local banks with a third level of authentication. Finally, a government agency or authorized agent of a government agency may have a sixth level of code that is shares with no one—and which no one even might know exists—that that the agency or agent uses surreptitiously to look for counterfeiting based upon illegal transmission of knowledge from the highest level of security.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The RFID tag 4 may be coupled with the substrate 6 when the document 2 is created as paper stock, or when the document is manufactured and stored for later addition or recording of information. The RFID tag 4 may thereby enable singulation and tracking of each personal document 2 of a plurality of personal documents 2, prior to an issuance of the personal document 2 as a useful document to a person or a third party.

The RFID tag 4 may enhance or support the function of a corporate seal associated with the secure personal document 2 and optionally without eliminating the need to, or presentation of, a visible corporate seal on the substrate 6.

The EPC may be or comprise an Electronic Product Code as issued by EPCglobal that provides access to information stored on the Internet. The RFID may include a record in the durable memory or in other memory that includes, or associates the secure personal document 2 with, a universal resource locator ("URL") of a website or other Internet identity. Additionally or alternatively, the RFID may optionally include a record in the durable memory or in other memory that includes, or associates the secure personal document 2 with, an account number or registration number of a person, such as a United States Federal Social Security Number ("SSN") or a financial services account number.

To save time and improve accuracy, the EPC information stored in durable memory, and more or all of the information stored in the durable memory and or elsewhere in the RFID tag, may be designed to be automatically written into and read out of the tag via the reader.

Certain secure documents or financial instruments, such as a court transcript, a deposition, a driver's license, paper currency, a personal check, deed, lien, contract, and other registered secure documents are widely used and efficient instruments for representing or memorializing a person's accomplishments, authorities, rights or privileges, and/or agreements or relationships among people and/or possessions. Authority for issuing and management of such documents may also be transferred from one agency to another. For example the Federal Government or other authorized public or private agent may delegate to a printer the authority to print currency simply by transmitting certain secret information and other authorization codes to that printer.

A group or plurality of secure documents 2 can be associated together by means of the information technology system 20 by writing a unique code into the RFID tag 4, where the unique code is derived from, and enables an association of each relevant secure document 2 with a primary or particular secure personal document 2. As one example, a plurality of secure documents 2 that relate to a single human being, e.g., a birth certificate, a driver's license, and a marriage certificate, can thereby be associated by the information technology system 20. The identity and some or all of the content of the associated personal secure documents 20 can be stored or replicated within one or more databases 12 of the information technology system 20.

These authentic secure personal documents are organized into an interlinked hierarchy wherein some primary documents (like a birth certificate) are used to certify one's birth, while other documents (like a driver's license) reference one's birth indirectly through the primary birth certificate document. All of these documents remain permanently linked to each other so that a change in one may be quickly reflected in them all. For example, one's death would automatically invalidate that person's driver's license or their voter's registration.

Figure 13:
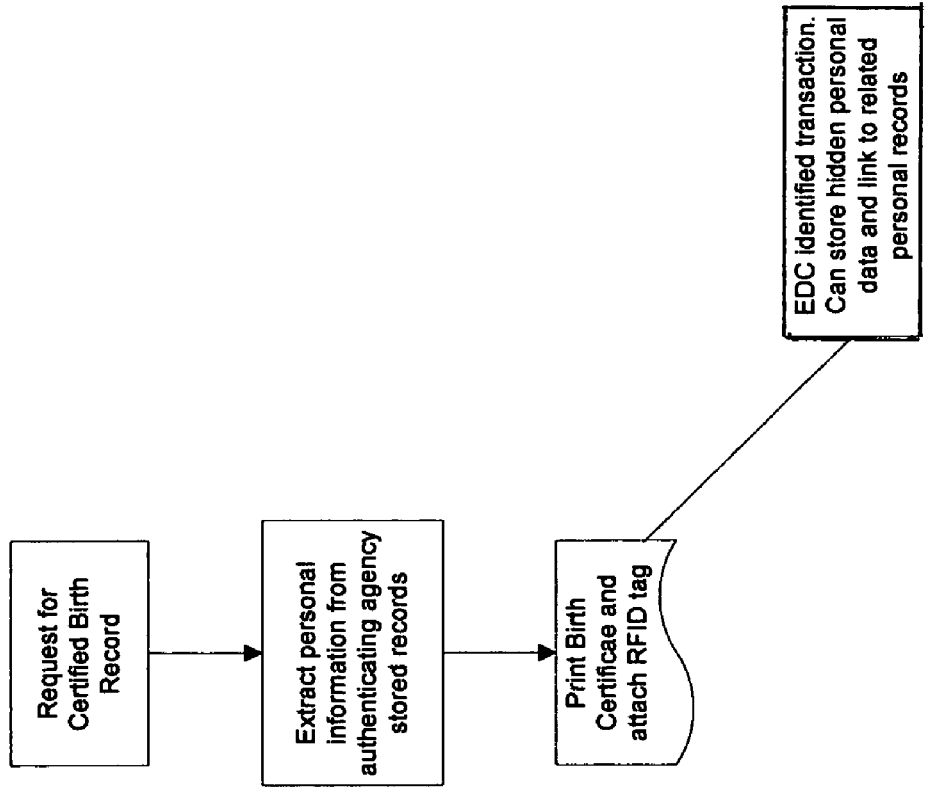
FIG. 13 is a process diagram of a first of optionally three steps of an alternate preferred embodiment of the method of the present invention.
Figure 14:
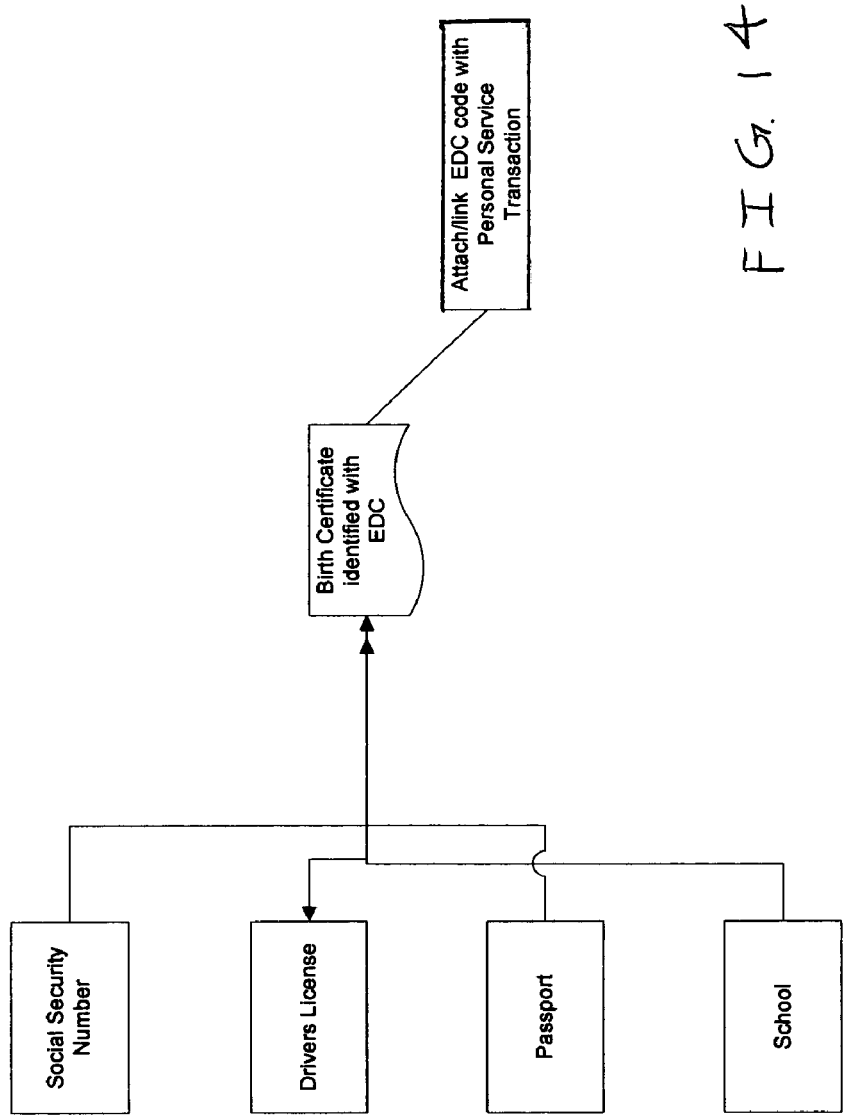
FIG. 14 is a process diagram of an optional second step of the alternate preferred embodiment of the method of the present invention of FIG. 13.
Figure 15:
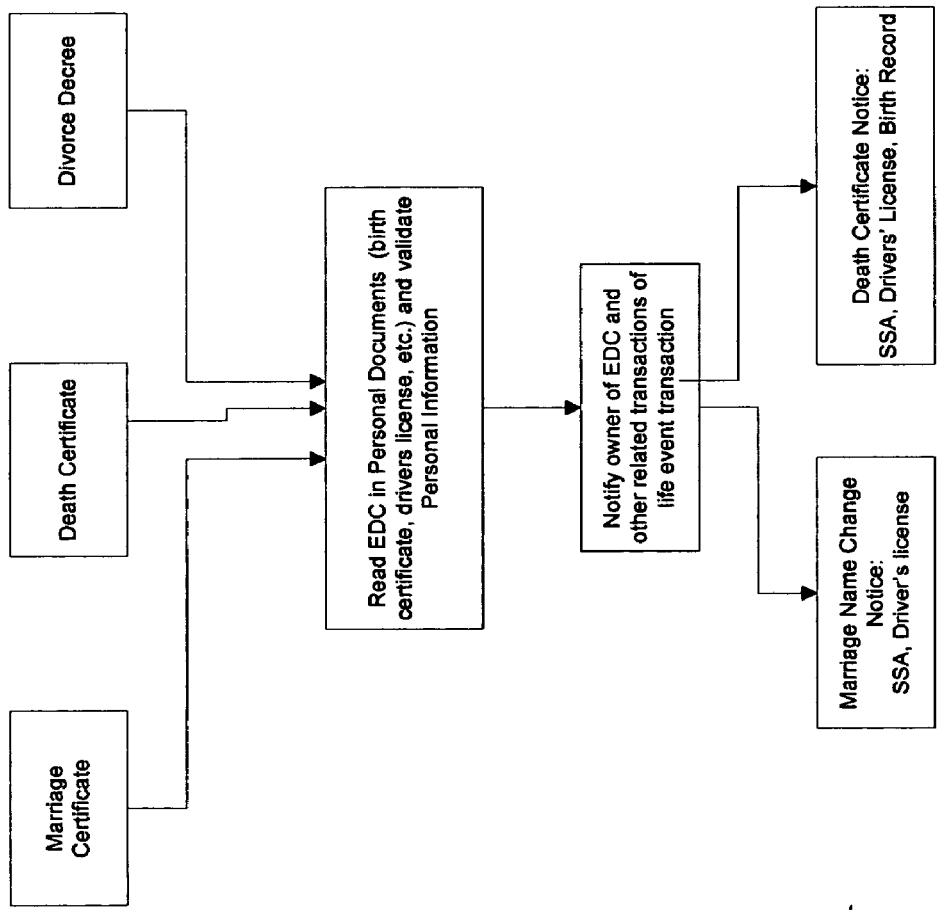
FIG. 15 is a process diagram of an optional third step of the alternate preferred embodiment of the method of the present invention of FIG. 13.

Referring now generally to the Figures and particularly to FIGS. 13, 14 and 15 are process diagrams of a Step 1, an optional Step 2 and an optional Step 3 of an alternate embodiment of the method of the present invention, or tracking method. In Step 1 of FIG. 13 a foundational personal secure document 2 is created with a unique EDC. The foundational personal secure document 2 may be a birth certificate. The EDC is then stored in the RFID 4, 86. THE EC may be or comprise, or be derived from a national account number, such as a United States Social Security Number ("SSN"). The RFID 4, 86 is coupled with a substrate of the personal document and the personal document is issued with information printed visibly on the substrate and with at least the EDC stored in the RFID 4,86. In Step 2 of FIG. 14 the EDC as stored on the foundational personal secure document is accessed by the network 20 via the RFID 4, 86 and the EDC is associated with additional personal documents 2 related to the same person for whom the foundational personal document was issued. The additional personal documents associated with the EDC may include a driver's license, a social security document, a passport and a school or educational document. The EDC may be used to associate the additional personal document with the foundational personal document, or with a personal transaction service or webservice, such as a monetary credit or debit account transaction service. In FIG. 15 the EDC is used to associate a document 2 generated by a life event, such as a marriage, a death or a divorce decree, wherein the life event relates to the person to whom the foundational personal document and the EDC stored in the RFID 4, 86 of the foundational personal document is associated. The network 20 may then detect the EDC of a life event document, such as a death certificate, marriage certificate or divorce decree. The network 20 may then be used by a server 82 or other suitable computational engine known in the art and communicatively linked with the network 20 to update the personal documents 2 related to the EDC by storing or modifying data in the RFID 4, 86 of one or more personal documents associated with the EDC. The tracking method would allow, for example, an RFID 4, 86 of a birth certificate to be updated to include information about the person the death of the person whose birth is documented by the birth certificate, or a driver's license having an RFID 4, 86 may be updated by storing information in the RFID 4, 86 that the driver's license is made void because the person to whom the driver's license was issued is deceased.

Those skilled in the art will appreciate that various adaptations and modifications of the just-described preferred embodiments can be configured without departing from the scope and spirit of the invention. Therefore, it is to be understood that the invention may be practiced other than as specifically described herein. The above description is intended to be illustrative, and not restrictive. Many other embodiments will be apparent to those of skill in the art upon reviewing the above description. The scope of the invention should, therefore, be determined with reference to the knowledge of one skilled in the art and in light of the disclosures presented above.

We claim:

1. A system for providing secure documentation, the system comprising:

an electronic communications network communicatively includes a first electronic memory and a second electronic memory;

a primary document includes the first electronic memory, and the first electronic memory containing a primary personal identification number, or "PIN", wherein the PIN that is related to a life event and the biometric measurement;

the life event selected from a group consisting of crossing a geographic border of a political jurisdiction, a birth of a human being, a death of a human being, a marriage, a divorce, a change in marital status, an adoption of a human being, a transition in military service status of a human being, a transition in health condition of a human being, a graduation of a human being from an educational organization, and an act of legal significance related to a human being;

the a biometric measurement selected from another group consisting of a biometric pattern, a DNA sequence, a photograph of a human being, a measurement of a part of the body of a human being, and a plurality of measurements of the body of a human being;

at least one secondary document including the secondary electronic memory, the secondary electronic memory containing at least one secondary digital code, wherein the secondary digital code is associated with the primary document, and wherein the primary document and secondary digital code are permanently associable with each other, and whereby a change in information stored in the memory related to the primary or secondary document may direct the communications network to automatically update information stored within electronic memories of a plurality of documents that are associated by the electronic communications network to either the primary or the secondary document.

2. The system of claim 1, wherein the first electronic memory contains a 2nd digital code, wherein the 2nd digital code is an encryption key, wherein modification to information stored in the secondary electronic memory of the second document by the electronic communications network requires application of the 2nd digital code.

3. The system of claim 2, wherein the first electronic memory is an RFID.

4. The system of claim 1, the system further comprising:
an information technology system comprised with the electronic communications network; and
a plurality of related documents, each related document having an associated electronic memory communicatively coupled with the information technology system, whereby the information technology system updates information stored in the associated electronic memories in accordance with changes of information stored in the first electronic memory of the primary document.

5. The system of claim 1, wherein the PIN and the secondary digital codes are permanently associable with each other.

6. The system of claim 1, the system further comprising:
means for printing information onto a surface of a flexible substrate; and
a plurality of related documents, each related document having an electronic memory; and
means for automatically updating information stored in the electronic memories of the related documents in accordance with information stored in the first electronic memory.

7. The system of claim 6, wherein at least one electronic memory of at least one related document is comprised within an RFID device.

8. The system of claim 6, wherein at least one electronic memory of at least one related document includes a record related to at least one life event.

9. The system of claim 8, wherein said personal information includes biometric information about the human being.

10. The system of claim 1, the system further comprising:
primary document having a flexible substrate having a surface, the surface visibly presenting information;
wherein an authentication of the primary document is based at least partly on the at least one secret key;
wherein access to the first information requires the use of the secret key, wherein the secret key may be communicated by private means from a first agency to a second agency and the secret key may be used to delegate authority from the first authority to the second authority; and
means for automatically updating information stored in a plurality of electronic memories of separate associated documents in accordance with information stored in the first electronic memory of the primary document.

11. The system of claim 10, wherein the transfer of authority from the first authority to the second authority is revocable.

12. The system of claim 10, wherein at least one instance of the secret key is stored on an RFID.

13. The system of claim 10, wherein at least one secret key is never sent to or read from the secure document, after the at least one secret key is initially written or read from the primary document.

14. The system of claim 1,
wherein access to a first portion of the first electronic memory requires the use of a first secret key, and access to a second portion of the first electronic memory requires the use of a second secret key;
wherein the information of the first and second portion of the first electronic memory and secret keys may be securely communicated from a first agency to a second agency and the secret keys may be used to delegate authority from the first authority to the second authority; and
means for automatically updating information stored in a plurality of electronic memories of separate associated documents in accordance with information stored in the first electronic memory of the document.

15. The system of claim 14, wherein the transfer of authority from the first authority to the second authority is revocable.

16. The system of claim 14, wherein at least one electronic memory of at least one related document is an RFID.

17. The system of claim 1, wherein the PIN is associated with a universal resource locator.

18. The system of claim 1, wherein the PIN is associated with a social security number.

19. The system of claim 1, wherein the first electronic document is addressable by means of an extensible markup language schema.

* * * * *